(12) United States Patent
Blaedow

(10) Patent No.: US 7,702,500 B2
(45) Date of Patent: Apr. 20, 2010

(54) METHOD AND APPARATUS FOR DETERMINING THE MEANING OF NATURAL LANGUAGE

(76) Inventor: Karen R. Blaedow, 867 Waban Hill, Madison, WI (US) 53711

( * ) Notice: Subject to any disclaimer, the term of this patent is extended or adjusted under 35 U.S.C. 154(b) by 1426 days.

(21) Appl. No.: 10/997,403

(22) Filed: Nov. 24, 2004

(65) Prior Publication Data

US 2006/0111895 A1 May 25, 2006

(51) Int. Cl.
G06F 17/27 (2006.01)

(52) U.S. Cl. ............... 704/9; 704/1; 704/10; 707/2; 707/3; 707/4; 707/5; 707/6; 715/254

(58) Field of Classification Search ............ 704/1, 704/9, 10; 707/1–6, 101, 102; 715/254
See application file for complete search history.

(56) References Cited

U.S. PATENT DOCUMENTS

| | | | | |
|---|---|---|---|---|
| 5,056,021 | A * | 10/1991 | Ausborn | 704/9 |
| 5,060,155 | A * | 10/1991 | van Zuijlen | 704/9 |
| 5,424,947 | A * | 6/1995 | Nagao et al. | 704/9 |
| 5,644,764 | A * | 7/1997 | Johnson et al. | 707/103 R |
| 5,715,468 | A * | 2/1998 | Budzinski | 704/9 |
| 6,070,134 | A * | 5/2000 | Richardson et al. | 704/9 |
| 6,112,168 | A * | 8/2000 | Corston et al. | 704/9 |
| 6,539,374 | B2 * | 3/2003 | Jung | 707/4 |
| 6,606,613 | B1 * | 8/2003 | Altschuler et al. | 706/21 |
| 6,978,262 | B2 * | 12/2005 | Tsai | 707/3 |
| 7,213,027 | B1 * | 5/2007 | Kominek et al. | 707/102 |
| 7,236,925 | B2 * | 6/2007 | Moore | 704/10 |
| 7,383,169 | B1 * | 6/2008 | Vanderwende et al. | 704/9 |
| 2006/0004563 | A1 * | 1/2006 | Campbell et al. | 704/9 |

OTHER PUBLICATIONS

Barnett et al., Knowledge and natural language processing, 1990, ACM, vol. 33, Issue 8, pp. 50-71.*
Fargues, J. et al 1986 Conceptual Graphs for Semantics and Knowledge Processing. IBM J. Res. Develop., 30(1), pp. 570-579.
Friedland, A. et al 2004 Project Halo: Towards a Digital Aristotle. AI Magazine 25(4): 29-47.
Katz, B. 1997 Annotating the World Wide Web using Natural Language. In Proceedings of the ACL 2000 Workshop on NLP&IR.
Katz, B and Lin, J. 2000 REXTOR: A System for Generating Relations from Natural Language. In Proceedings of RIAO '97.
Lenat, D.B. 1995 Cyc: A Large-Scale Investment in Knowledge Infrastructure [Electronic Version]. Communications of the ACM, 38(11), 32-38.

(Continued)

*Primary Examiner*—David R Hudspeth
*Assistant Examiner*—Lamont N Spooner
(74) *Attorney, Agent, or Firm*—Quarles & Brady LLP

(57) ABSTRACT

A method for processing natural language includes receiving an information input string. Referent tridbits corresponding to stimuli in the information input string are generated. Assert tridbits defining relationships between the referent tridbits are generated. A language processing system including a rules database and a meaning engine. The rules database is operable to store a plurality of syntax rules. The meaning engine is operable to receiving an information input string, generate referent tridbits corresponding to stimuli in the information input string based on the syntax rules, and generate assert tridbits defining relationships between the referent tridbits based on the syntax rules.

14 Claims, 14 Drawing Sheets

OTHER PUBLICATIONS

Sowa, J. F. 1979 Semantics of Conceptual Graphs, In Proceedings of the 17th Annual Meeting of the ACL.

Sowa, J. F. and Way, E. C. 1986 Implementing a Semantic Interpreter Using Conceptual Graphs. IBM J. Res. Develop., 30(1), pp. 57-69.

* cited by examiner

METHOD AND APPARATUS FOR DETERMINING THE MEANING OF NATURAL LANGUAGE

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to the field of processing natural language and, more particularly, to a method and apparatus for determining the meaning of natural language.

Various attempts have been made in the field of artificial intelligence to develop systems capable of understanding natural language. Common sense dictates that understanding natural language is to "get" its meaning, allowing the listener to answer questions about what was said. A language processing system that claims to understand the sentence, "The boy threw the red ball to the girl.", should be able to answer "Who threw the ball?", "What was thrown?", "What color is the ball?", etc. It is neither necessary nor sufficient that the listener produce a grammatical diagram of the sentence. It is the meaning that drives everything else. Once an internal way of representing the information in our world is developed, grammars or other methodologies to convey this information to others can be contemplated. But the meaning comes first.

Some natural language systems, such as chatbots, behave as if they understand natural language, but actually obtain little or no useful semantic knowledge from the natural language they process. Other systems understand a predefined set of syntax rules, essentially pulling multiple keywords out of a sentence. For example, a system for controlling an appliance may allow commands such as such as "Set the X to Y" to be processed. In such a system, a user first selects the device to control from a list, for example a TV, and then selects a parameter related to the device, such as, "Set channel to 12".

Systems of this type are useful only within tightly constrained environments, where the grammar can be predefined and the values of the parameters can be hardwired to specific actions the system can perform. However, these systems do not understand in any general way the information they process. Moreover, they cannot adapt to speech and environment, requiring the user to learn very specific ways to talk to them.

Other systems that seek to achieve a significant level of understanding transform the natural language they process into some form of knowledge representation, often based on predicate logic. One problem with these types of systems is that their knowledgebases, often referred to as ontologies, are complex structures that are labor intensive to construct, requiring experts to meticulously translate human knowledge into the structures used by the ontology. This complexity limits their content areas. For example, the Massachusetts Institute of Technology has used their Oxygen system to build spoken language interfaces to provide information about the weather or obtain schedules and fares for airline flights. However, the system does not function well beyond those very limited areas of expertise.

Another exemplary ontology is the Cyc project, started by Stanford Professor Doug Lenat in 1984. Cyc's ontology stores many different types of information, giving each its own structure and requires predicates, functions, logical connectives, quantifiers, constants, non-atomic terms, variables, microtheories and a host of other elements. This complexity makes the development of the language processing system resource intensive and limits its adaptability.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

BRIEF SUMMARY OF THE INVENTION

One aspect of the present invention is seen in a method for processing natural language. The method includes receiving an information input string. Referent tridbits corresponding to stimuli in the information input string are generated. Assert tridbits defining relationships between the referent tridbits are generated.

Another aspect of the present invention is seen in a language processing system including a rules database and a meaning engine. The rules database is operable to store a plurality of syntax rules. The meaning engine is operable to receiving an information input string, generate referent tridbits corresponding to stimuli in the information input string based on the syntax rules, and generate assert tridbits defining relationships between the referent tridbits based on the syntax rules.

Still another aspect of the present invention is seen in a knowledge processing system including a knowledgebase and a meaning engine. The knowledgebase is operable to store referent tridbits corresponding to stimuli and assert tridbits defining relationships between the referent tridbits. The meaning engine is operable to access the knowledgebase and perform a reasoning process using at least one of the referent tridbits and the assert tridbits.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
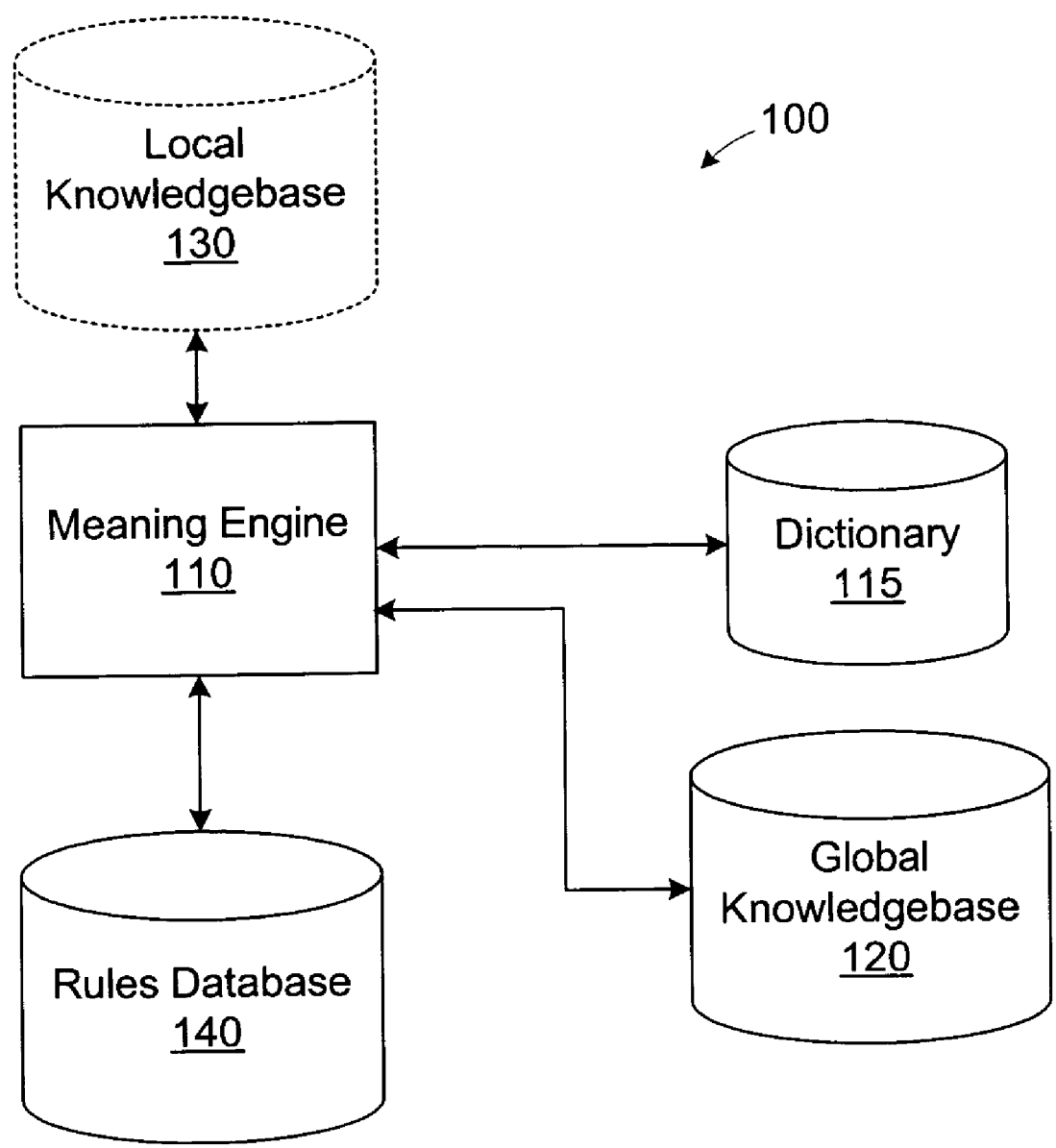
FIG. 1 is a simplified block diagram of a language processing system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Referring now to the Figures, first, to FIG. 1, a simplified block diagram of a language processing system 100 is provided. The language processing system 100 includes a plurality of functional units, which typically exist as software and data structures executed and maintained by a general purpose computing device or distributed amongst a plurality of computing devices. The language processing system 100 includes a meaning engine 110 that performs functions to determine the meaning of information provided to the language processing system 100. The information provided may be in the form of text or voice data that is converted into text by a separate or integrated voice recognition engine (not shown). For purposes of illustration in the following examples, the information is shown as text strings that are provided to the language processing system 100, such as through a computer keyboard or other input device.

The language processing system 100 includes a dictionary 115 that defines words for use by the meaning engine 110. A global knowledgebase 120 stores baseline knowledge for use by the meaning engine 110, as is described in greater detail below. The meaning engine 110 maintains a local knowledgebase 130 (e.g., dynamic memory in a run-time environment) for storing information currently being processed. Information items may be retrieved from the global knowledgebase 120 by the meaning engine 110 and stored in its local knowledgebase 130 while a current session is being conducted. When the term knowledgebase is used below it may refer to the global knowledgebase 120 or the local knowledgebase 130, depending on the specific context. A rules database 140 is provided that specifies rules the meaning engine 110 uses to deconstruct the information it receives into elements of an underlying language data structure. Although the rules database 140 is illustrated as a separate entity, the rules may be simply programmed into the meaning engine 110. The dictionary 115, global knowledgebase 120, and rules database 140 typically exist as relational databases or tables stored on a program storage device, such as a hard disk drive. The local knowledgebase 130 typically resides in the dynamic memory of the processing device implementing the language processing system 100, and as such, is illustrated using dashed lines to represent this temporary nature.

The meaning engine 110 maps natural language to meaning utilizing knowledge structures that more accurately reflect the information structure that humans process. The meaning engine 110 employs a model based on a unique structure for representing knowledge, referred to herein as "tridbits" and uses rules in the rules database 140 for discriminating and combining different types of information to represent the meaning of natural language.

The following discussion includes two basic sections. The first section describes what meaning "looks like" by describing the static knowledge structures used by the meaning engine 110, referred to as tridbits. The tridbit structure provides a consistent way of representing the information contained in natural language. The knowledge structure consistently represents the underlying information in sentences as well as facilitates the process of getting from the surface structure to the knowledge structure. The second section describes the mechanisms employed by the meaning engine 110 to get from a sequence of words to the tridbit structure representing meaning.

The meaning engine 110 represents things in the world using referent tridbits of various types. Each tridbit in the knowledgebase 120, 130 has the same structure, basically three elements in an organized configuration, giving rise to the name "tridbit". However, when used herein, the term tridbit, is not intended to be limited to this specific three element structure. For example, the structure could be changed to have a different number of elements. In the illustrated embodiment, the meaning engine 110 employs three broad types of tridbits, referent tridbits, assertion tridbits, and commands. As will be described in greater detail below, the particular tridbit type determines how each of the elements are used and what relationships must hold between each pair of elements.

Figure 2:
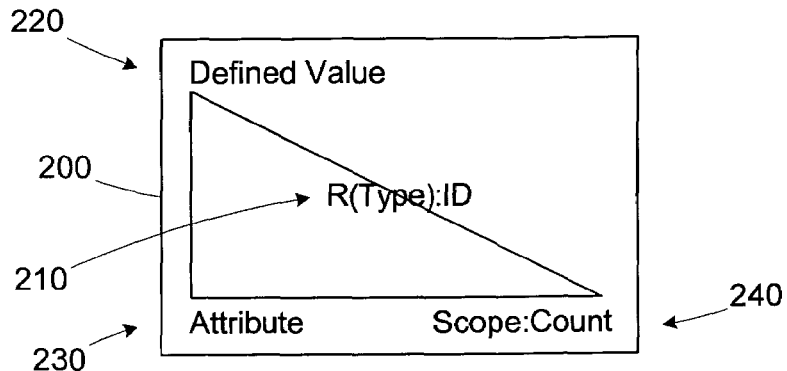
FIG. 2 is a diagram illustrating the general structure of a referent tridbit.

FIG. 2 illustrates the general structure of a referent tridbit 200. The elements of a referent tridbit 200 are:

Type: <thing, event or property>;

ID: unique value for identifying the referent;

Attribute: How the referent is defined, typically by name or category;

Value: Name, category or other attribute value assigned to the referent;

Scope: <general, specific or qualified>; and

Count: numeric value representing how many.

A referent tridbit 200 includes a label element 210, a defined value element 220, an attribute element 230, and a scope/count element 240. A referent tridbit 200 may be represented graphically in FIG. 2, or textually using the format:

| Label | Defined Value | Attribute | Scope: Count |
|---|---|---|---|

Consider the simple child's utterance "Mommy go".

Figure 3:
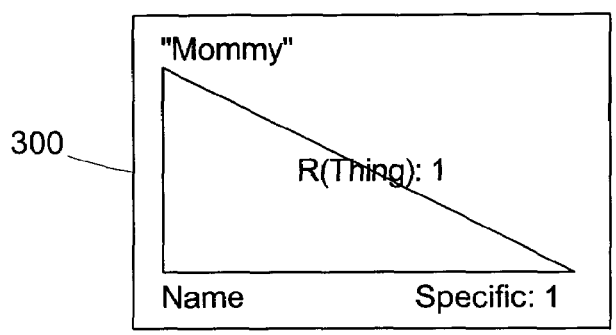
FIG. 3 is a diagram of a specific referent tridbit.

"Mommy" is represented by a referent tridbit that is a single specific thing. It is referenced by name (Mommy) rather than category, for example woman. Thus a tridbit in the knowledgebase 120, 130 represents the specific individual Mommy. FIG. 3 illustrates the Mommy tridbit 300 in graphical form. The Mommy tridbit 300 may be referred to using the notation tridbit <1>. The textual format for the Mommy tridbit is:

| R(Thing): 1 | Mommy | Name | Specific: 1 |
|---|---|---|---|

For ease of illustration, the tridbits in the following discussion are represented textually rather than graphically in the Figures.

A referent represents an organization of stimulus that humans can discriminate and use. Referents include:
- things that exits (a person, the sky, a chair or chairs in general);
- events that occur (specific episodes of going, seeing, breaking, meeting or meetings in general); or
- properties that describe things or events (loud, red or big)

Each referent tridbit in the knowledgebase 120, 130 is given a unique ID so that it can be referenced by other tridbits. As seen in FIG. 2, the referent label element 210 in the diagram of a referent tridbit starts with the letter "R" to indicate it is a referent tridbit 200. The referent type; thing, event or property, follows in parenthesis. The referent's unique ID follows the type. When one tridbit refers to another referent it uses its unique ID.

Each point of the triangle holds an element of the tridbit 200. The attribute element 230 indicates the defining attribute of the referent tridbit 200. Attributes are described in greater detail below in the discussion related to assertion tridbits. In general, a referent tridbit 200 is defined in one of two ways, by name or by category.

In the example illustrated by the "Mommy" tridbit 300 in FIG. 3, the tridbit for Mommy is defined by name, as indicated by the attribute element 230 indicating "Name" and the defined value element 220 having the corresponding name "Mommy".

A referent tridbit 200 can also be defined by category. Considering the simple utterance, "Mommy go", the second word of the utterance, "go", may be defined by category using the tridbit:

| R(Event): 2 | Go | Category | Specific: 1 |
|---|---|---|---|

The referent label "R(Event):2" declares this a referent tridbit of type event, with a unique ID of 2. Instead of having a name, this referent is defined by category, as indicated by the attribute element 230. It represents an event that can be categorized as a "go" event. Both Mommy and go are specific single referents as indicated by the scope/count element 240 in FIG. 2, with the value of "Specific:1".

To illustrate how the meaning engine 110 uses scope information, consider the following sentences:
1) The boy likes the bike.
2) The boy likes bikes.
3) Boys like the bike
4) Boys like bikes.
5) The boys like the bikes.

There are three main concepts that are referenced in each of the sentences: boys, liking and bikes. Concepts are categories of referents. Humans not only possess a hardwired ability to find patterns in the stimulus they receive, but also categorize the stimulus into concepts like table, chair, fruit, animal, run, give, blue, loud pretty, etc.

We think of understanding the word bike as having dictionary-like information about the word: Bike—a wheeled pedaled vehicle.

We take for granted the ability to distinguish specific instances of bikes, for example the boy's new red mountain bike, from the general concept of bikes. When we encounter a new bike stimulus, we process both the categorical information, i.e., we note the thing is a bike, and whether we have encountered this specific individual thing before. The meaning engine 110 creates a referent tridbit for this stimulus that will serve to anchor further information. Creating a proper type of referent, and recognizing a new stimulus as that of a specific individual already in the knowledgebase is crucial to building an information structure that will store information in a useful human-like way. It allows us to hold information about a specific bike and bikes in general.

Scope is an important piece of information required to create an appropriate referent for a stimulus. Scope basically indicates how a referent relates to its category in terms of membership. If the category is bike, scope indicates if the referent is a specific member or members of the bike category, or all bikes in general, or an unspecified subset of bikes, etc.

Consider a simple case of a specific boy who likes a specific bike, which is the situation described in sentence 1: The boy liked the bike.

The tridbits representing the referents in sentence 1 are diagramed below:

| R(Thing): 3 | Boy | Category | Specific: 1 |
|---|---|---|---|
| R(Event): 4 | Like | Category | Specific: 1 |
| R(Thing): 5 | Bike | Category | Specific: 1 |

Tridbit <3> represents one specific boy, a specific member of the set of boys. Likewise, tridbit <5> represents one specific bike. The referent of "like" is essentially the same as far as scope, but is conceptualized differently because of the time element inherent in events. Tridbit <4> represents a specific "like event". Scope works the same for events as things. A specific event is a specific member of the set of events of that category, in this case "like" events.

The tridbits <3-5> establish referents to three specific things and events in the world, a boy, a bike and a liking. The meaning engine 110 represents relationships between referents using assert attribute tridbits 400, shown in FIG. 4. An assert attribute tridbit 400 includes a label 410, "A(Attribute): #", an asserted value element 420, an attribute element 430, a target element 440, and a truth:certainty element 450. Assert attribute tridbits 400 are briefly mentioned here and discussed more fully below. For purposes of the following discussion, the truth:certainty element 450, which is described in greater detail below, is omitted. An assert attribute tridbit 400 may be expressed textually using the format:

| Label | Asserted Value | Attribute | Target |
|---|---|---|---|
| | | | |

It takes two assert attribute tridbits 400 to fully express the relational information in the sentence, "The boy liked the bike.":

| A(Attribute): 6 | <3> boy | Subject | <4> like |
|---|---|---|---|
| A(Attribute): 7 | <5> bike | Object | <4> like |

Tridbit <6> asserts the boy is the subject of the like event and tridbit <7> asserts the bike is the object of the like event. Thus, tridbits <3-7> fully capture the information in sentence 1.

Now, vary the scope starting with sentence 2: The boy likes bikes.

The scope of bike has changed from representing a specific bike to bikes in general. This changes the scope of tridbit <5>, the referent tridbit representing bike, to what is shown below:

| R(Thing): 5 | Bike | Category | General: 100 |
|---|---|---|---|

The scope changes from specific to general, and the count becomes 100, which represents all members of the category. The other parts of the referent tridbit remain the same. The only practical difference is that tridbit <5> now refers to bikes in general. Any tridbit that belongs to the category of bikes will share the attributes of that category, which, according to tridbit <7>, includes being liked by the boy. When tridbit <5> referred to a specific bike, that attribute transfer was not valid. Natural language provides clues to resolve references, such that the referent tridbit points to the correct referent, including scope, which is discussed below in the section relating to grammar and resolving and reducing references.

Going on to sentence 3: "Boys like the bike."

This sentence is much like the previous, in that the scope and count of one of the referents, in this case "boys", has changed. Now instead of one specific boy liking one specific bike, Boys in general like that specific bike. So if one is a boy, one likes that bike. This change in meaning is accomplished by simply changing the scope and count of tridbit <3> as shown below, so it goes from referring to the boy, to referring to boys in general.

| R(Thing): 3 | Boy | Category | General: 100 |
|---|---|---|---|

In sentence 4: "Boys like bikes", both boys and bikes refer to the general categories of boys and bikes. These referents would be represented by tridbits whose scope is general, which were illustrated by the last two tridbits diagrammed above.

In sentence 5: "The boys like the bikes", the scope of all the referents is specific, exactly the same as what they were in sentence 1. Instead we changed only the count. Rather than referring to a single specific boy and bike, sentence 5 refers to a specific group of boys and a specific group of bikes. The count simply tells us how many members of the category we are referring to: one, more than one, a few, lots? A count of more than one, which is all we can confer from sentence 5, would be represented as follows:

| R(Thing): 3 | Boy | Category | Specific: −101 |
|---|---|---|---|
| R(Thing): 5 | Bike | Category | Specific: −101 |

In English, plural forms of nouns are often used to signify both scope and count information, which might cause these concepts to be confused. Scope determines the answer to the question: which one? If the scope is specific, the answer involves providing additional details to differentiate one or more specific individuals. If the scope is general, the answer is all, any, or it does not matter. Count provides an idea of how many individuals or what portion of the category is referred to. Consider the following examples of scope and count:

1. Bring me the spoon.

spoon scope=specific (there is a specific spoon I want), count=single

2. Bring me a spoon.

spoon scope=general (assuming I don't care which one), count=single

3. Bring me 3 spoons.

spoon scope=general (assuming I don't care which ones), count=three

4. Bring me spoons.

spoon scope=general, count=more than one, but all would be difficult

5. Spoons are cutlery.

spoon scope=general, count=all

The usage of articles and plurals in the above examples is very useful in establishing the scope and count of the spoon referent, but not foolproof, as illustrated in the last two examples. Despite the same plural form of the noun, "spoons", being used without an article, the count varies. When a property is assigned to a plural noun, as in the last sentence, the plural noun represents all members of the category. In the sentence above it, that same plural noun as the object of an action such as bring, represents multiple arbitrary members of the category. When humans receive transmissions of information, the message will be made to fit within the constraints of what makes sense to the receiver.

The meaning engine 110 has the capability to properly interpret many of these subtle patterns. Furthermore, it has the fundamental structure that allows it to learn new patterns, though this may involve interaction with a trainer.

A referent tridbit 200 contains information to establish a reference to stimulus in the world. This information includes scope/count as well as the attribute (name or category) used to define the referent. Other information, including gender, person, etc., are also included for convenience but could equally be asserted in a separate assert attribute tridbit 400.

Assert attribute tridbits 400 are now discussed in greater detail. These tridbits 400 express the relationship between referent tridbits 200. Referent tridbits 200 alone convey very little information. They are simply the manifestation of putting a label on a set of stimulus, which is not to say that applying that label provides no information. At a minimum it identifies a set of stimulus that can be discriminated by humans. And it gives that stimulus a label that can be used to store and retrieve additional information about the referent tridbit 200. That additional information is stored in other tridbits, many of which will be assert attribute tridbits 400 that establish a relationship between the referent tridbit 200 of interest and other referent tridbits 200. Consider the following examples:

The size of Texas is big.
The capital of Texas is Austin.
The driver of the car is Matt.
Matt drove.

The assert attribute tridbit representations of the information contained in these examples is:

| A(Attribute): 8 | Big | Size | Texas |
| A(Attribute): 9 | Austin | Capital | Texas |
| A(Attribute): 10 | Matt | Driver | Car |
| A(Attribute): 11 | Matt | Subject | Drive |

Figure 4:
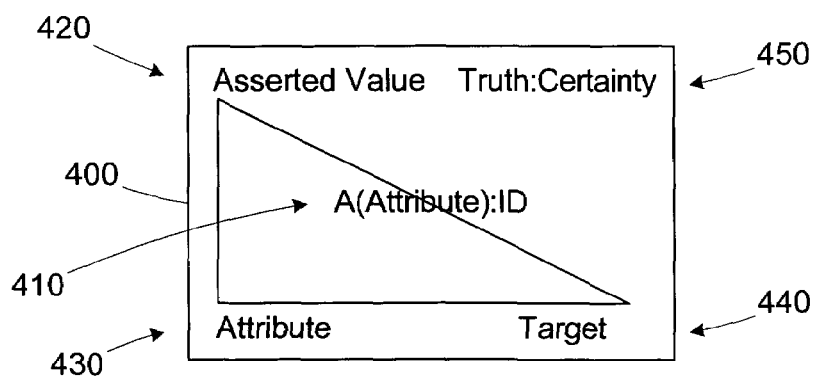
FIG. 4 is a diagram illustrating the general structure of an assert attribute tridbit.
Figure 5:
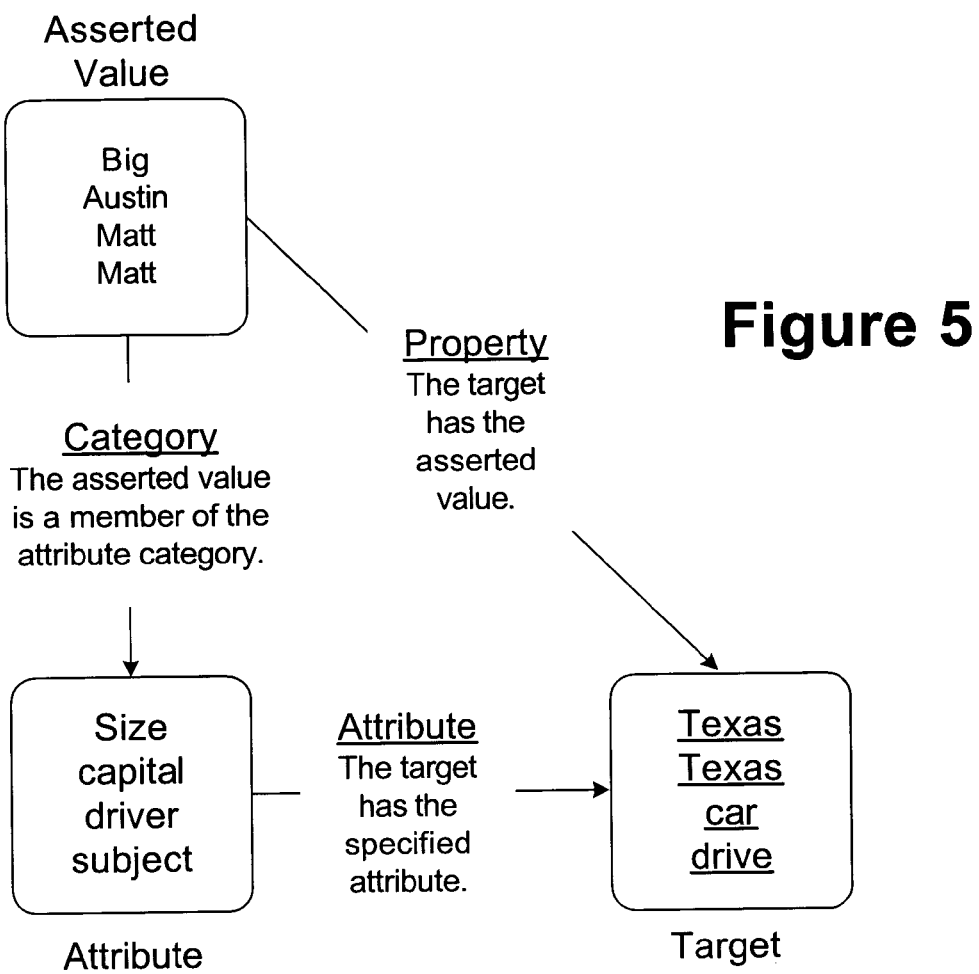
FIG. 5 is a diagram illustrating the constraints of an assert attribute tridbit.

FIG. 5 illustrates graphically how constraints imposed on the assert attribute tridbits 400 create a consistent structure for representing these different types of information. It is important to understand the relationships that must exist between each of the elements for the assertion to be valid. Because of this rigid structure, the attribute element 430 is more restricted than the target element 440 and the asserted value element 420 of the tridbit, which can refer to anything the meaning engine 110 is capable of understanding, including names stored in the dictionary 115 and any type of tridbit. Referring to FIG. 4, the attribute element 430 is constrained by the relationship between it and the asserted value element 420. The attribute element 430 must be a category of which the asserted value element 420 is a member. Categories are represented by a R(Thing) referent tridbit 200. Even if the members of the category are property referents as in color, events as in meetings, or other assertions as in reasons, the category itself is a R(Thing). Its instantiations may not be.

Though all attributes must be categories, not all categories are attributes. Table is a category of things, but it is not an attribute. However, a category of properties such as color, volume, and taste are attributes, although not of everything. Attributes might be thought of as the type of information that is available about an object. Humans process attributes of an object instinctively. The A(Attribute) tridbit 400 captures the value of a specified attribute of a specified object.

By understanding the constraints of an assert attribute tridbit 400, it is possible to disambiguate attribute information, even though the grammar may not prescribe a fixed position for each element, or leave one out. When the constraints are recognized, each element looks like a puzzle piece that can only go in one place.

Because attributes are referents to categories, knowledge about an attribute may be stored the same as any referent. There can be categories of attributes, such as event participants, of which subject, object and recipient are members. And of course there can be rules involving attributes, which are simply consequences of assertions. For example, if X is the mother of Y, then Y is the child of X.

In most cases, humans do not have to be told what an attribute is. A child automatically observes attributes of objects. When she is taught the color of grass is green, the system is already in place to pull color attributes from visual objects. The lesson fine-tunes the system, giving labels to the type of information observed and values we wish the child to discriminate. Thus humans are hardwired to process perceptions by picking out their attributes. However, since the meaning engine 110 has no hardwired perception of anything, it relies on rules of thumb and specific linguistic knowledge for processing attributes. For example, categories of properties, e.g., color, size and weight, are assumed to be attributes. The meaning engine 110 is trained about all other attributes, such as president. A statement like "President is an attribute" allows the meaning engine 110 to process president as an attribute of objects. Of course president is only a property of a small set of objects, like banks and countries. The meaning engine 110 learns this through language exposure and training, much like humans.

Even humans cannot pick out properties like president through perception. President is not a perceived attribute like color and size. A distinction may be made between attributes that reside in the object, whether they are observed directly or measured indirectly, and those that are assigned externally such as president and capital, and can not be determined by observation or measurement.

While this distinction may only be interesting from a theoretical/philosophical perspective, it may have some linguistic relevance. The more observable the attribute, the more likely its values will represented by a property referent, e.g., blue, big or soft. Properties are a distinct type of referent because they do not represent an instantiated object in the world. One wouldn't say "Go get me a blue, a big or a soft". These terms describe qualities of the received stimulus, rather than name the objects causing the stimulus. Properties are applied to objects. The meaning engine 110 makes the distinction between property-assigning attributes and object-assigning attributes by knowing what referent type the members of a category must be.

Figure 6:
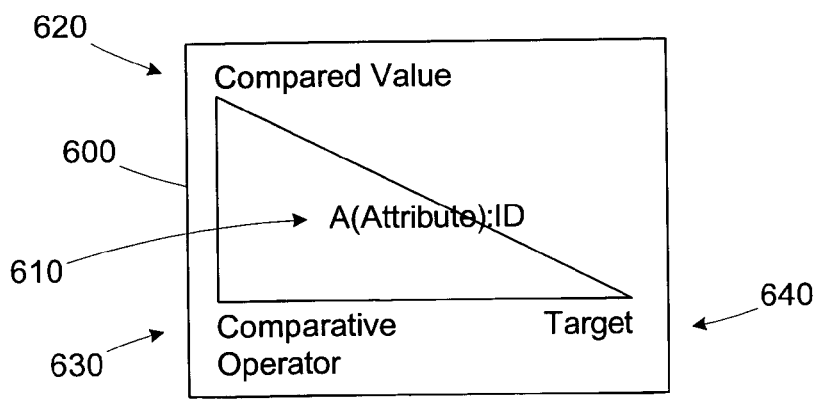
FIG. 6 is a diagram illustrating the general structure of an assert comparison tridbit.
Figure 7:
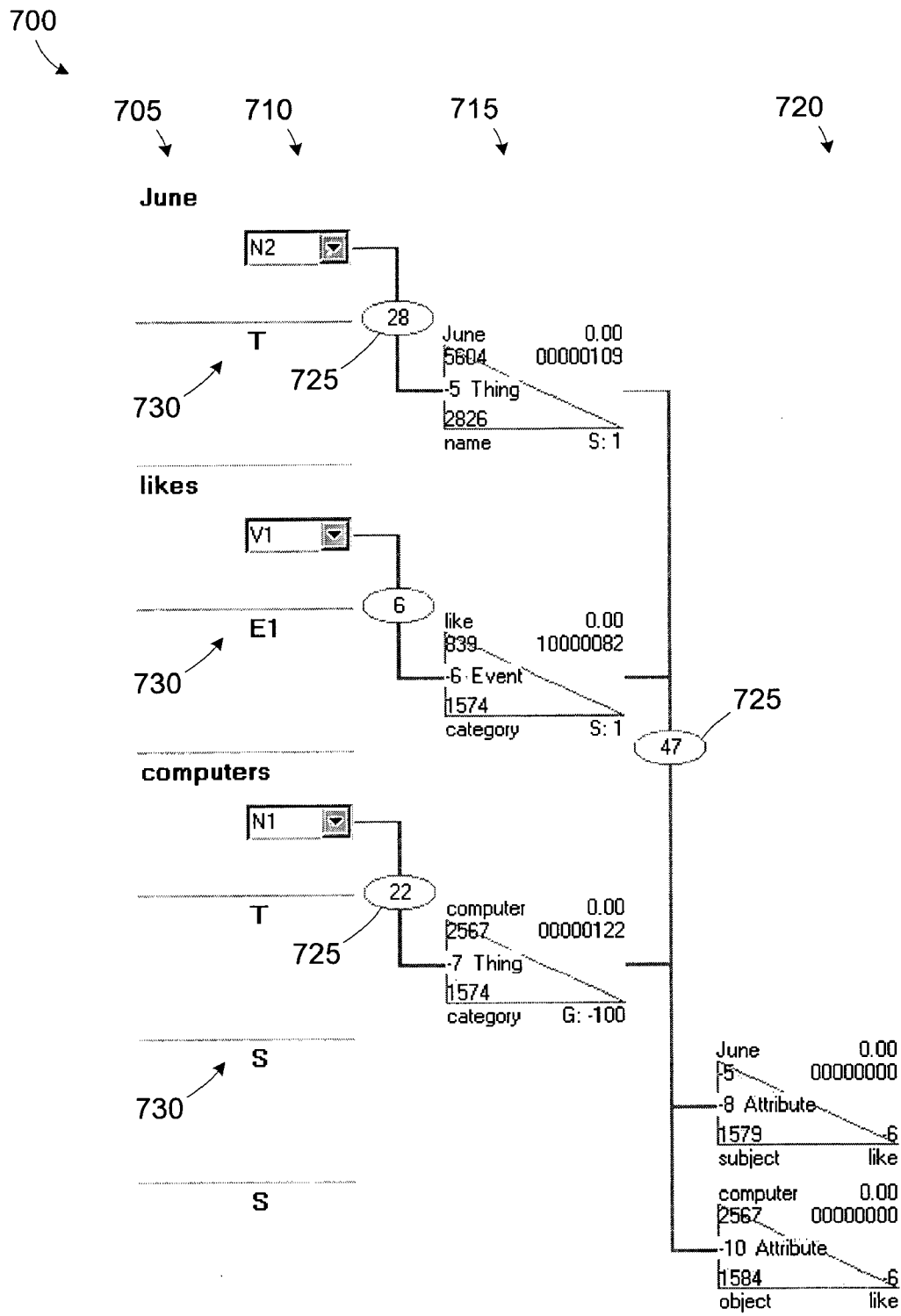
FIGS. 7-12 illustrate meaning maps for an exemplary language string processed by the language processing system of FIG. 1.
Figure 8:
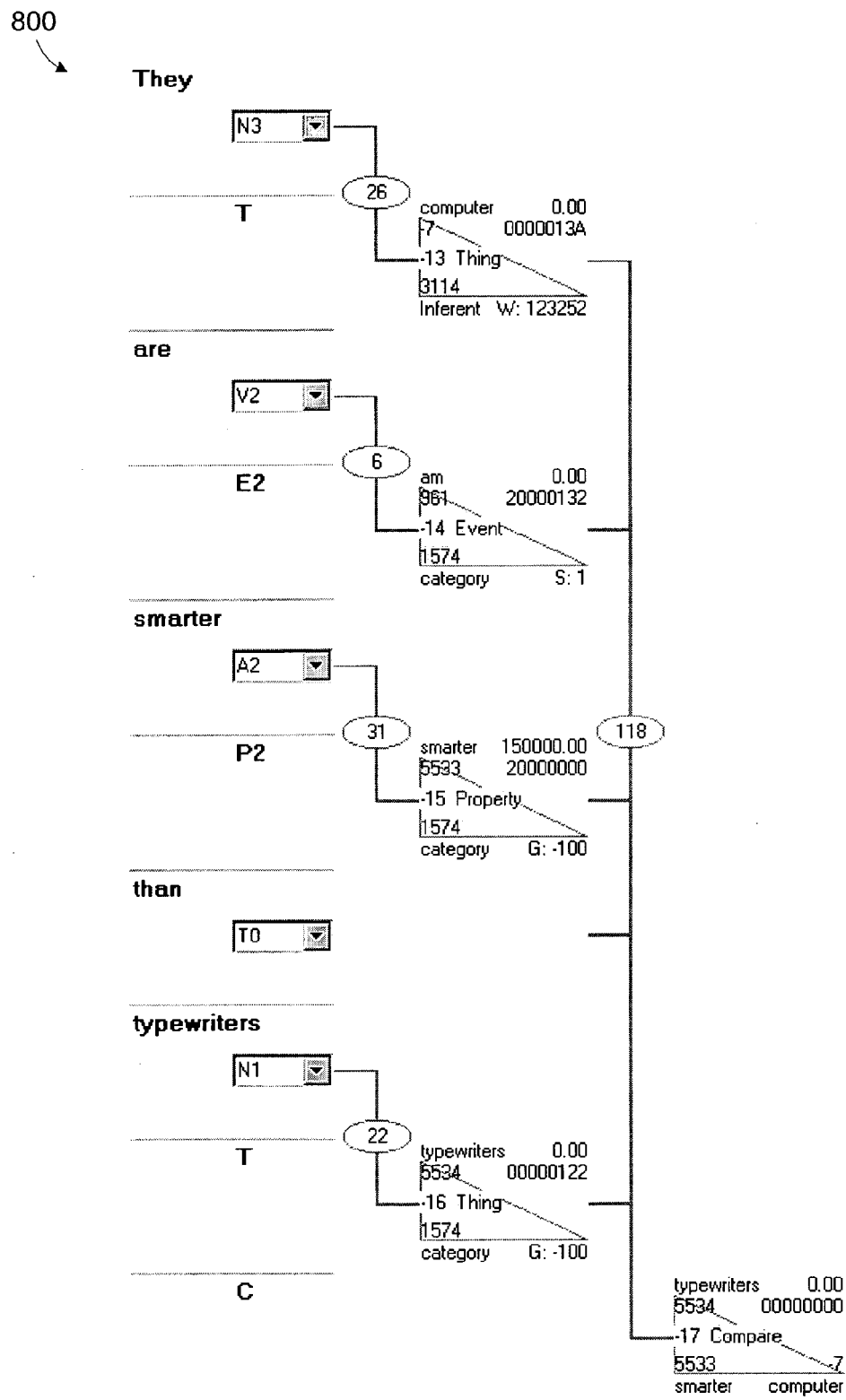
Figure 9A:
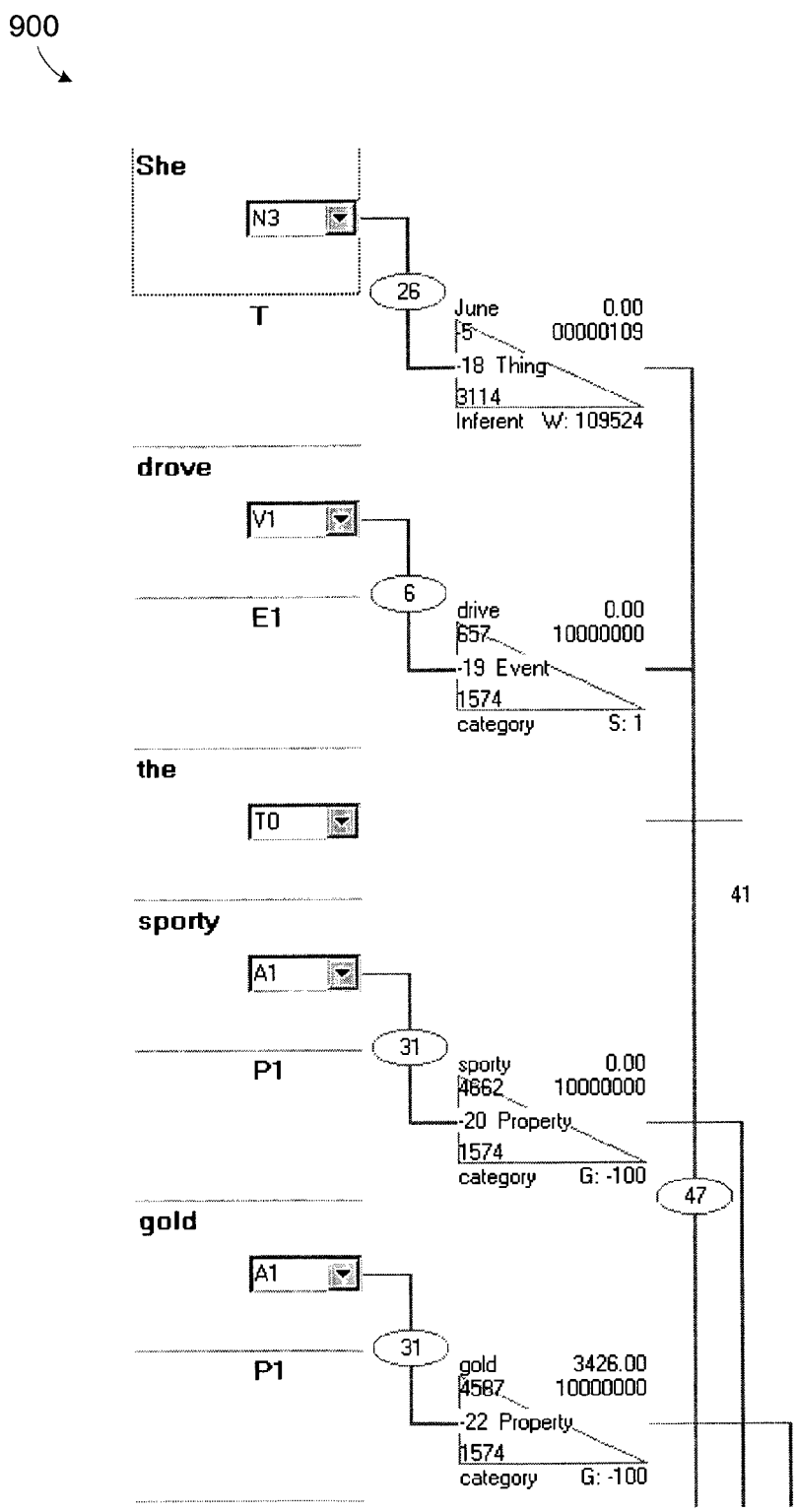
Figure 9B:
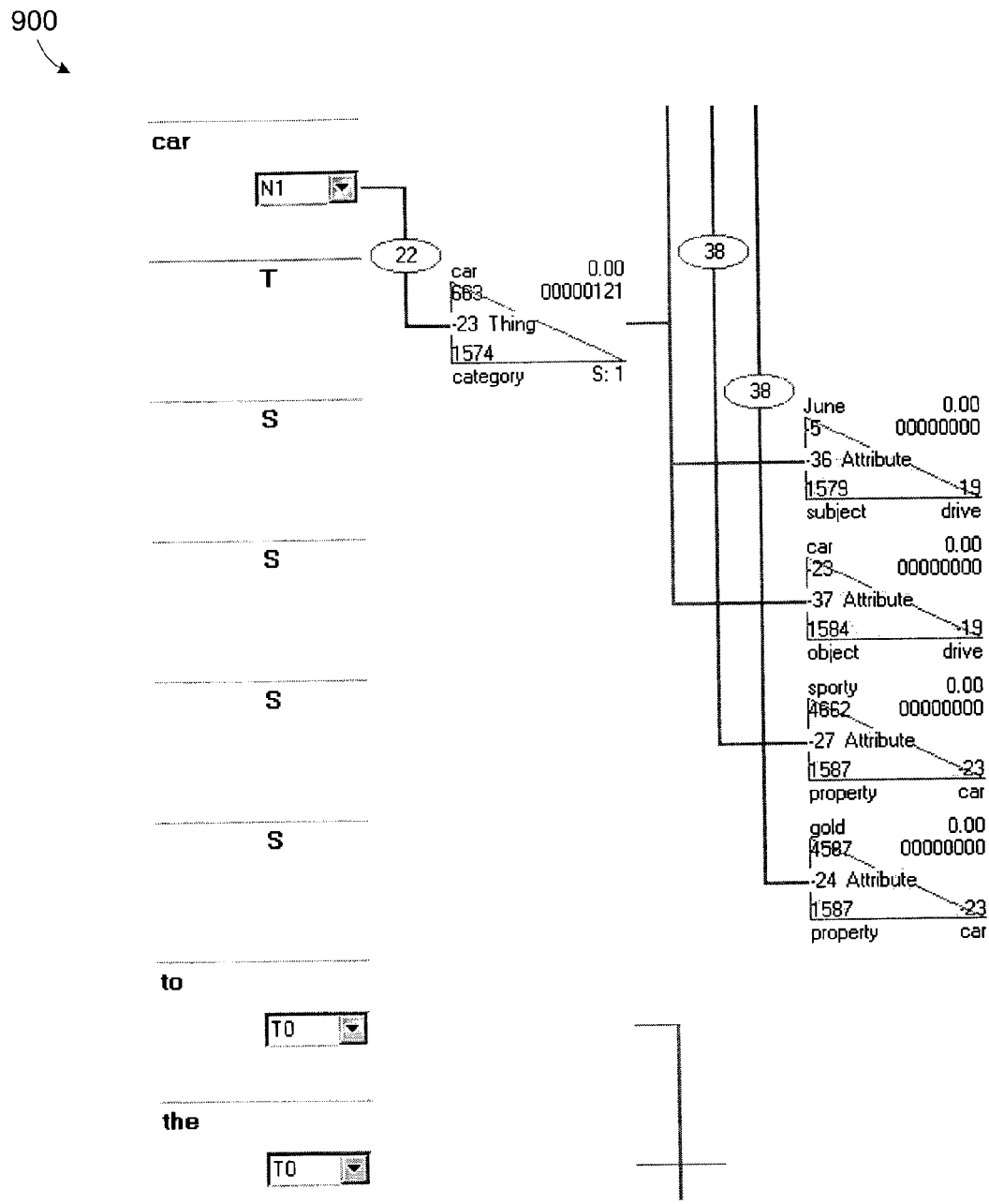
Figure 9C:
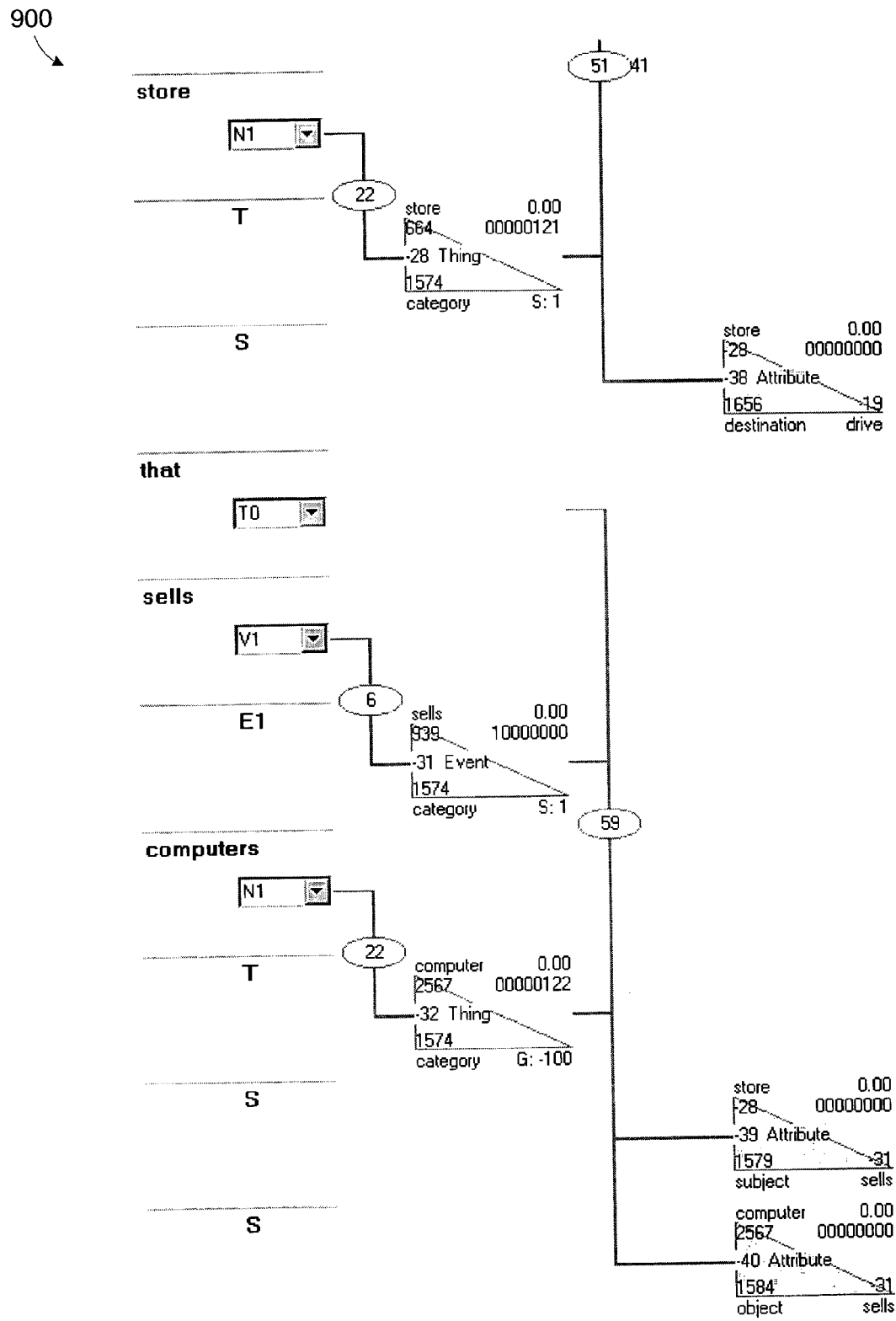
Figure 10:
Figure 10:
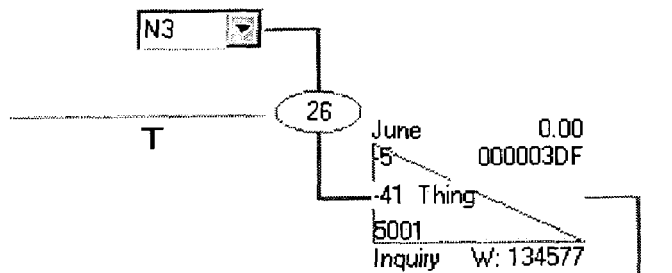
Figure 10:
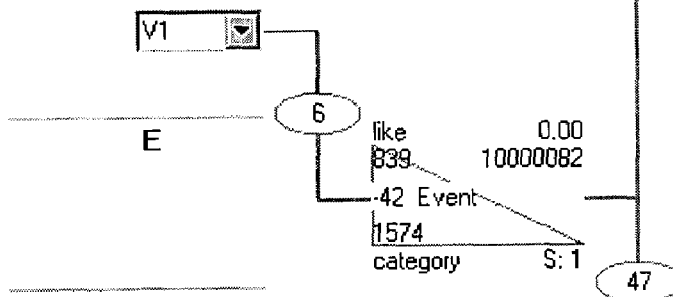
Figure 10:
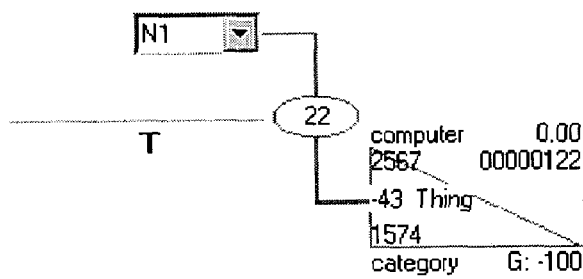
Figure 10:
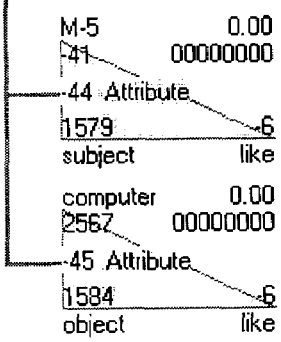
Figure 11:
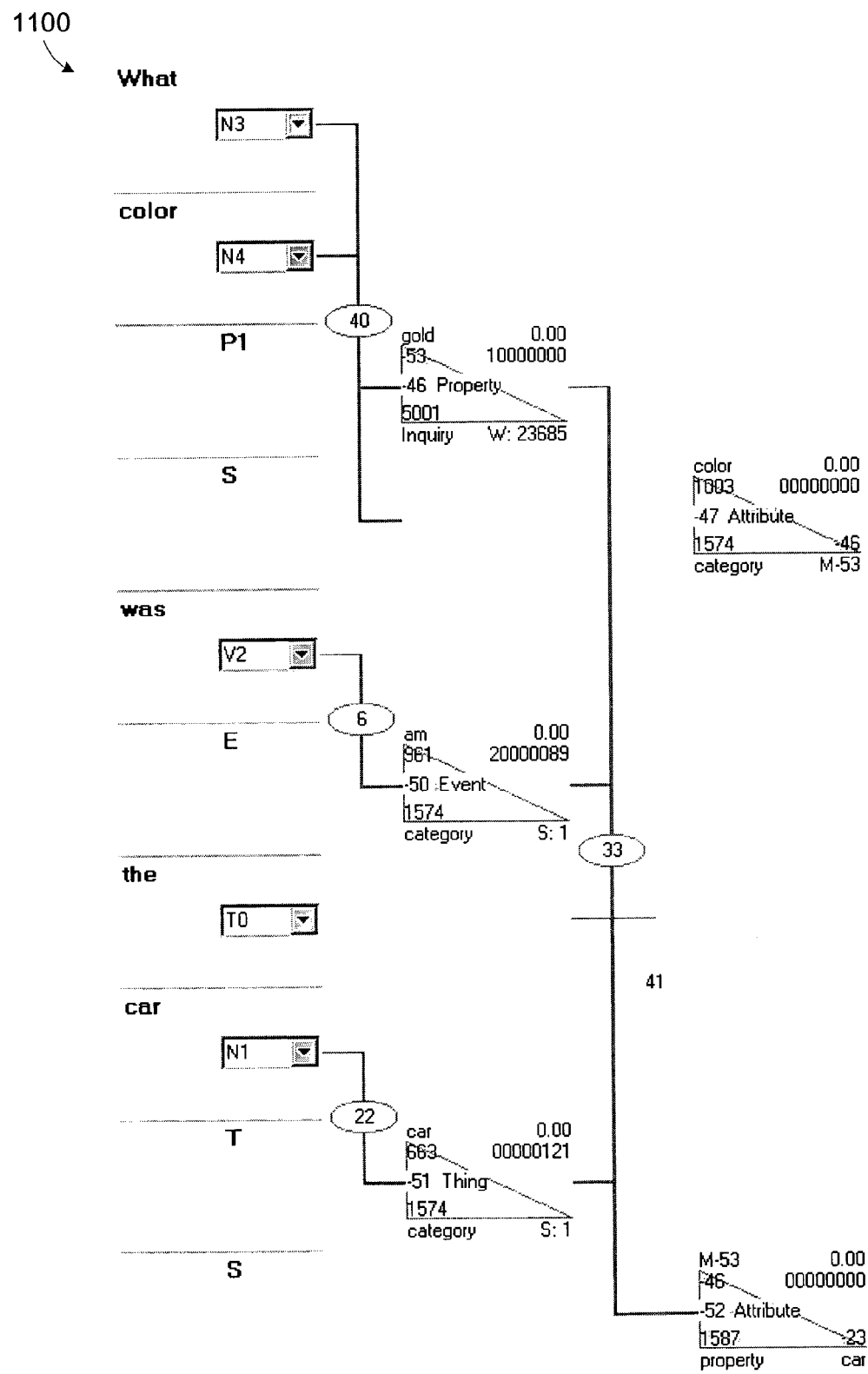
Figure 12A:
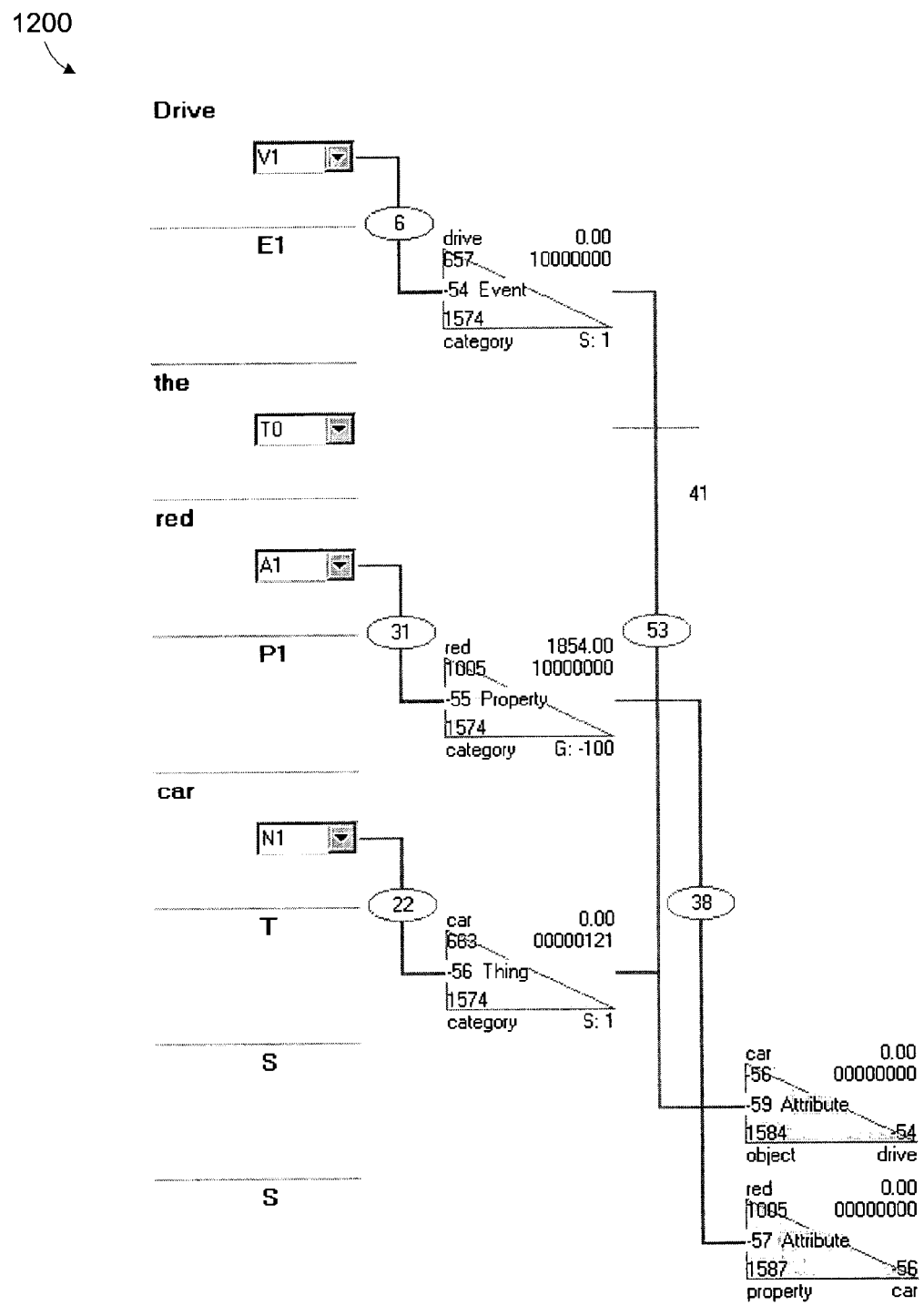
Figure 12B:
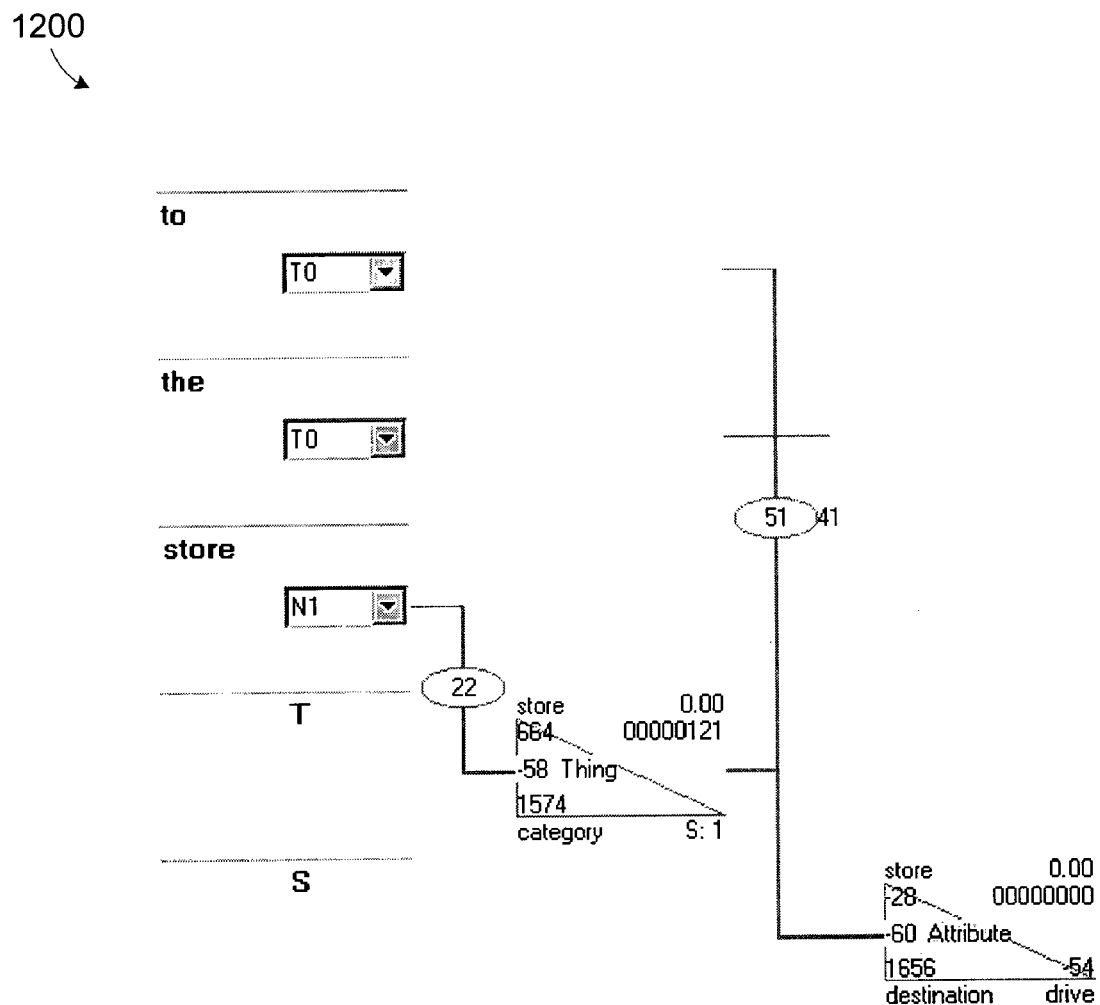

An assert comparison tridbit 600, shown in FIG. 6, is a second type of assertion tridbit used by the meaning engine 110 to express relative or comparative information. An assert comparison tridbit 600 includes a label 610, "A(Comparison):#", a compared value element 620, an comparative operator element 630, and a target element 640. The textual format for an assert comparison tridbit 600 is:

| Label | Compared Value | Comparative Operator | Target |

Consider the following sentence:
1) Dan is bigger than Karen.
The meaning of this sentence expressed in tridbits is:

| R(Thing): 12 | "Dan" | Name | Specific:1 |
| R(Property): 13 | Bigger | Category | General:1 |
| R(Thing): 14 | "Karen" | Name | Specific:1 |
| A(Attribute): 15 | <16> | Property | <12> Dan |
| A(Compare): 16 | <14> Karen | <13> Bigger | <15> |

Notice in tridbit <15> the attribute uses the default "property". The attribute is not specifically given in the sentence, but implied as the category of bigger, which would be size. There may be a point at which the default is filled in by the listener's knowledge about bigger, but that point likely varies with the individual. It could be done within the grammar, or really any time thereafter, up until the listener is asked something like, "What size is Dan?" when he is forced to plug in the knowledge that big is a size, if he is to answer correctly. The meaning engine 110 may use a procrastination strategy, leaving information in a fairly raw form and reasoning with it as needed. Different strategies for refining information may influence the efficiency for doing different types of information processing One might further ask if tridbit <15> is necessary. It would seem that everything needed to understand the comparison is contained within tridbit <16>, the assert comparison tridbit 600. In this case, eliminating tridbit <15> and having the target of the assert comparison tridbit 600 refer directly to <12> Dan, would result in the same meaning. The comparative operator, bigger, indicates that the size attribute of the other two elements is being compared. However, limitations in this approach are illustrated with the following examples:

2) Dan weighs more than Karen.

This generates the same referent tridbits, but the assertion tridbits would be the following:

| A(Attribute): 15 | <16> | Weight | <12> Dan |
| A(Compare): 16 | <14> Karen | <13> More | <15> |

In this case, the comparison operator, more, does not imply an attribute. However, the target of the assert comparison tridbit 600 refers to a specific attribute of Dan, namely his weight. It is possible for any or none of the elements to reference attributes. If one of the elements references an attribute, the implication is to use the corresponding attributes of the other elements. Thus the compare tridbit above refers to Karen's weight, even thought her weight attribute is not specifically referenced. The examples below show cases where no specific attribute is referenced:

3) Dan is more than Karen.

4) A lanai is like a porch.

In both sentences, the comparative operators "more" and "like" do not imply a specific attribute, and neither do the target or compared value. In general, this lack of specificity is interpreted as referring to a sum of the applicable attributes.

Sometimes attributes are mixed to achieve interesting comparisons, such as in the examples below:

5) Dan's IQ is greater then Karen's weight.

Notice that sentence 5 requires that both the target and compared value refer to the attributes being compared, since the attributes are not the same, as shown below:

| R(Thing): 17 | IQ | Category | General:1 |
| R(Thing): 18 | Weight | Category | General:1 |
| R(Property): 19 | More | Category | General:1 |
| A(Attribute): 20 | <22> | <17> IQ | <12> Dan |
| A(Attribute): 21 | <22> | <18> Weight | <14> Karen |
| A(Compare): 22 | <21> | <19> More | <20> |

Some attributes, especially location, but also time, are most naturally expressed in relative terms. Near, above, in, to the right of, etc., are all relative operators to express location. Notice, too, that in tridbit <19> the comparative operator is defined as a property referent. Comparisons can be used as the value of an assert attribute tridbit 400. Further, near, above, in, to the right of, etc., are locations. Like other properties, they are not instantiated—near, above, in, and to-the-right-of are not things in the world.

The following discussion introduces referent reduction, a useful processing step that is easy to overlook. Consider the sentence: "The boy threw the ball." and the question: "Who threw the ball?"

The sentence may be represented by the following tridbits:

| R(Thing): 31 | <> Boy | <> Category | Specific:1 |
| R(Event): 32 | <> Throw | <> Category | Specific:101 |
| R(Thing): 33 | <> Ball | <> Category | Specific:1 |
| A(Attribute): 34 | <31> Boy | <> Subject | <32> Throw |
| A(Attribute): 35 | <33> Ball | <> Object | <32> Throw |

The question may be represented as:

| A(Attribute): 37 | <?> | <> Subject | <32> Throw |

To answer the question, it is necessary to understand that the question refers to the same throw event as the original statement. This may seem obvious to a human observer, but the meaning engine 110 will generate a referent to a throw event each time it encounters the word "threw" in both the statement and the question. There is nothing special about the second throw event to indicate it refers to the same event as the first one. The meaning engine 110 must explicitly detect this situation by employing a layer of processing after it creates the referents and assertions, which is referred to as referent reduction. The meaning engine 110 looks at all the referents in the sentences and their relationships with other referents and determines which referents can be reduced to already existing referents. The duplicate referent tridbits are then eliminated and any reference to them is changed to refer to the previously mentioned referent.

Consider the following statements:

1) Barry got the book.

2) He turned to page 56.

3) The researcher found the passage.

4) Barry began to read.

It takes no conscious effort for a normally literate human to realize that the subject of all these sentences refers to the same specific individual. Nonetheless, the meaning engine 110 requires processing to make that realization when different words are used for the referent, such as the pronoun "He" in sentence 2, or the phrase "The researcher" in sentence 3. Referent reduction is also required in sentence 4, even though the exact same name is used.

Each unique stimulus about which information is stored must have only one unique referent tridbit, or the information will be stored under multiple referents. In performing reference reduction, the meaning engine 110 determines for each referent in a newly understood sentence if there is a previously mentioned referent that should be used instead. The meaning engine 110 uses a variety of strategies in making this determination. Consider the following examples:

1) Todd read the newspaper.

2) Mitch read the newspaper.

3) Mitch read the book.

In some cases, a hard and fast rule, e.g., that events must have the same subject and object to be the same event, may be used to determine if the referents are the same. Thus the above reading events would not be considered the same event. While this rule seems to hold for event referents and their subject and object attributes, it does not hold for all attributes, as illustrated with the sentences below:

1) Deb gave the book to Kyle.

2) Deb gave the book to Erica.

3) Deb read the book to Kyle.

4) Deb read the book to Erica.

Sentences 1 and 2 could not be the same event because there can only be one recipient of a physical object per give event. However sentences 3 and 4 could be the same event since Deb could read to both Kyle and Erica simultaneously. In this case, it is not evident whether the events in 3 and 4 are the same. So there does not seem to be a hard and fast rule about the recipient attribute. A deeper understanding of specific event types and their attributes is needed to effectively perform referent reduction. Rules used for referent reduction may be shaped by language exposure, combined with feedback, to correct inappropriate reduction choices.

The following discussion describes how and when referents are instantiated from their base concepts. This will involve a discussion of scope and its interaction with referent reduction. The idea of a tridbit being defined by category was introduced using the example of the child's utterance of "Mommy go" described above, and repeated here.

| R(Thing): 1 | Mommy | Name | Specific: 1 |
| R(Event): 2 | Go | Category | Specific: 1 |

Tridbit <2> represents an event that can be categorized as a "go" event. The go event category is also a tridbit, the stored tridbit representing the general concept of all go events, which would look like the following:

| R(Event): ID(go) | <> Event | <> Category | General: 100 |

This tridbit is created the first time the meaning engine 110 encounters a word ("go" in this case) that refers to a concept not stored in the knowledgebase 120, 130.

Consider a related example: "Dad likes doughnuts". Assume the meaning engine 110 has not encountered any of these words before. In this case, when the meaning engine 110 looks up the word "doughnuts" in the dictionary 115, it finds no entry with a concept ID for a plausible word use.

Word use is similar to part of speech, but the meaning engine 110 makes some of its own distinctions while not using all of the conventional distinctions. For example, the distinction between adjective and adverb is not particularly useful. However, the meaning engine 110 needs to distinguish between different types of nouns, which represent significantly different types of things. These types include categories of things, such as tables and people, categories of properties, such as color and size, and proper names, such as William and Wisconsin. The conventional part-of-speech classification needs to be mapped into the functionally oriented word use classification that the meaning engine 110 employs.

When the meaning engine 110 encounters a word without plausible use information, it asks how the word is used in the sentence, which looks for the most part like an inquiry about part of speech. The choices typically fall into 4 categories: noun or pronoun, verb, adjective or adverb, and anything else, which is considered a tag word. The most important distinction is between a word or sequence of words that have a referent and tag words, which simply help direct the generation of relationships and other information (notably scope) involving the referents.

Nouns, pronouns, verbs, adjectives and adverbs, which represent a set of stimulus in the world, have a link from their entry in the dictionary 115 to the tridbit representing the general concept of the thing, event or property covered by that word use. In general, nouns and pronouns generate thing referents, verbs generate event referents, and adjectives and adverbs generate property referents. However, this generalization may have exception. Certain prepositions, such as "in" and "above" will generate property referents. The dictionary 115 may list "in" as an adjective when it is used as a comparative operator, such as being lost in a field. Another obvious exception is the verb "is", which really serves as a function word in most contexts. Word use categorization and the grammar rules combine to determine what referents are generated by the patterns found in a sequence of words.

The initial encounter with a word use that represents a referent causes the general form of the referent to be generated and linked to the word use listing in the dictionary 115. Thus, the first encounter with the word "doughnuts" used as a noun (specifically, a noun representing a category of things), causes a tridbit representing all doughnuts in general to be created, which is shown below.

| R(Thing): ID(doughnut) | <> Thing | <> Category | General: 100 |

This general concept tridbit is stored in the global knowledgebase 120 and linked to the entry in the dictionary 115 for doughnut. Exemplary dictionary entries are shown below in Table 1.

TABLE 1

Exemplary Dictionary Entries

| Word | Use | Stem | ConceptID |
|---|---|---|---|
| doughnuts | noun | doughnut | ID(doughnut) |
| likes | noun | likes | |
| likes | verb | like | |
| like | verb | like | |
| like | adjective | like | |
| Dad | proper noun | Dad | |

The general concept tridbit is general in scope and its count includes all members. It is defined by category, and the category is thing, event, or property, depending on the referent type. The general concept tridbit is assigned a unique tridbitID (e.g., represented as ID(doughnut)), which becomes the conceptID stored in the dictionary 115. The general concept tridbit represents the category of all doughnuts and its conceptID is used to refer to this category in all other tridbits.

During the processing of words in the sentence, grammar rules from the rules database 140 cause tridbits to be generated. These tridbits are first stored in the local knowledgebase 130 and are transferred to the global knowledgebase 120 if and when they are deemed worth remembering beyond the current session. Rules that generate referent tridbits make an instance of the concept tridbit in the local knowledgebase 130. The grammar rules designate whether the tridbit is defined by name (as in proper nouns) or category (everything else). The tridbit's value in either case is the conceptID of the trigger word. The rule also specifies the initial scope and count. Event referent tridbits generally start out specific in scope, things and properties general. Parameters within tridbits can be modified by grammar rules as well. Scope is commonly modified by rules invoked by tag words such as "the" and "a".

The first time the meaning engine 110 encounters the word "doughnuts", a concept tridbit is created, stored in the global knowledgebase 120, and linked to the dictionary 115. Every time the meaning engine 110 encounters the word "doughnuts", it triggers a grammar rule that generates an instance of the concept tridbit in the local knowledgebase 130 (i.e., dynamic memory).

The example: Dad likes doughnuts produces the following referent tridbits 200:

| R(Thing): 38 | "Dad" | < > Name | Specific: 1 |
| R(Event): 39 | < > Like | < > Category | Specific: 1 |
| R(Thing): 40 | < > Doughnuts | < > Category | General: 100 |

Each of the words in the sentence triggers a grammar rule that generates a referent tridbit 200 by instantiating the concept tridbit linked to the word in the dictionary 115. The numeric representation of the value in each of these tridbits (i.e., the number that would actually appear between the "< >"s) is the conceptID of the word after the "< >"s. To complete the meaning of the sentence, two assertion tridbits are used:

| A(Attribute): 41 | <38> Dad | < > Subject | <39> Like |
| A(Attribute): 42 | < > Doughnuts | < > Object | <39> Like |

The interpretation is that Dad likes all doughnuts. If X is a doughnut, Dad would like it. Note that two referent tridbits represent all doughnuts at this point. One is the concept tridbit for doughnuts stored in the global knowledgebase 120, and the other is tridbit <40> stored in memory (e.g., the local knowledgebase 130). The meaning engine 110 locates the tridbits it reasons with in memory and is able to arbitrate between the two when necessary. However, referent reduction is performed on any subsequent references to all doughnuts, preventing any further proliferation of tridbits that look like <40>. Of course, that is also true of references to Dad or his liking of doughnuts.

If the concept that Dad likes doughnuts is to be remembered beyond the current session, any referents to all members of a category, such as tridbit <40>, should be reduced to the concept tridbit before being stored in the global knowledgebase 120. This ensures that information about a concept, in this case doughnuts, is stored in one place: the concept tridbit.

For tridbits with a specific scope, a determination must be made whether the global knowledgebase 120 already contains a tridbit for this specific referent. If there are no referents in the global knowledgebase 120 with a name of Dad, a new referent tridbit for Dad should be created in the global knowledgebase 120. But we might have heard a conversation about a man who likes doughnuts, and unbeknownst to us, that man is Dad. Or we may have several referents in the knowledgebase with the name Dad and we cannot tell which one likes doughnuts. The desired result is that each referent, whether specific or general, has a single tridbit in the global knowledgebase 120 that represents it.

The following section relates to general qualified concepts. The statement about Dad liking doughnuts may be changed from a statement about a general concept (i.e., doughnuts) to a general qualified concept. Suppose it is discovered that Dad does not really like all doughnuts, just powdered doughnuts. As a referent, powdered doughnuts is general in scope. We are not referring to one or more specific doughnuts that Dad likes, but the category of all doughnuts that have the qualification of having a coating of powdered sugar.

Recall the tridbit that was generated to represent doughnuts in the initial statement: Dad likes doughnuts:

| R(Thing): 40 | < > Doughnuts | < > Category | General: 100 |

Consider what happens if we assign a powdered attribute to this referent as shown below:

| R(Property): 43 | < > Powdered | < > Category | General: 1 |
| A(Attribute): 44 | <43> Powdered | Property | <40> Doughnuts |

The doughnuts that Dad likes now have the attribute of being powdered, but so do all doughnuts. If this information is stored in the knowledgebase, it will eliminate any recognition of glazed, French or chocolate doughnuts. If X is a doughnut, it will be powdered.

It is not that general concepts should not be assigned properties. On the contrary, that is one of the most useful mechanisms for efficiently storing information. Doughnuts are round, are food, are sweet, are often eaten for breakfast with coffee, but not all doughnuts are powdered.

To address this situation the count of the referent for doughnuts is changed from all to a subset as below:

| R(Thing): 40 | < > Doughnuts | < > Category | General: 101 |

Dad likes a subset of doughnuts and that subset is powdered. Note that if this updated information is stored in the global knowledgebase 120, tridbit <40> cannot be reduced to the concept tridbit for doughnuts, since tridbit <40> no longer refers to all doughnuts. A new tridbit is created in the global knowledgebase 120 for this subset.

Now consider the situation that Mom likes glazed doughnuts. When this sentence is processed by the meaning engine 110, another tridbit representing a subset of doughnuts is generated:

| R(Thing): 45 | < > Doughnuts | < > Category | General: 101 |
| R(Property): 46 | < > Glazed | Category | General: 1 |
| A(Attribute): 47 | <46> Glazed | Property | <45> Doughnuts |

Tridbit <40> and tridbit <45> both represent a subset of all doughnuts, but it is clear that the subsets are not the same, one is powdered and one is glazed. Referent reduction passes over these two tridbits. Reference reduction may be difficult to perform on a subset. Even if the statement "Mom likes powdered doughnuts also" is made, it may be qualified by the statement "but only the ones made by Grandma". If the referents had been reduced for the first statement, they would have to be unreduced, and a new attribute would be added to the doughnuts Mom likes:

| A(Attribute): 47 | <43> Powdered | Property | <45> Doughnuts |
| R(Thing): 48 | "Grandma" | Name | Specific: 1 |
| A(Attribute): 49 | <48> Grandma | Made by | <45> Doughnuts |

Note that tridbit <47> has been changed so that the subset of doughnuts Mom likes, which are represented by tridbit <45>, are powdered as well as made by Grandma.

Representing subsets in this manner has some limitations. To answer the question, "Who likes powdered doughnuts?", all referents that are a subset of doughnuts are found, and narrowed down to those that include powdered as a property. Then, all like events that have one of these subsets as its object are identified. The subject of those events would be the answer. This method may be processing-intensive and may increase storage. Three tridbits are required to represent powdered doughnuts that Dad likes (40-42) and another three to represent the ones Mom likes (45-47).

Another technique for representing this type of information is a qualified general concept. A qualified general concept for powdered doughnuts is shown below:

| R(Thing): 40 | < > Doughnuts | < > Category | Qualified: 100 |
| R(Property): 43 | < > Powdered | < > Category | General: 1 |
| A(Attribute): 44 | <43> Powdered | Property | <40> Doughnuts |

The only thing that has changed about the referent to powdered doughnuts is in tridbit <40>, where the scope has changed from general to qualified. A qualified referent defines a new concept that is a subset of the category indicated by the tridbit's value, rather than an instance of the value's category. Attributes may be assigned to all members of the qualified concept, which is how the qualified concept is typically distinguished from the unqualified concept. All members of the qualified set of doughnuts are powdered, but not all members of the unqualified set are powdered. We could add that the qualified set of doughnuts are round, but there is no reason to do this since the qualified set will inherent the attributes of the unqualified set, which includes being round.

By choosing to make powdered doughnuts a general qualified concept, we can make instantiations of it, rather than instantiating a subset of doughnuts and repeating the attributes that distinguish the subset as powdered doughnuts. Thus the referent for Mom's doughnut preference can be simplified to:

| R(Thing): 45 | < > Powdered doughnuts | < > Category | General: 101 |
| R(Thing): 48 | "Grandma" | Name | Specific: 1 |
| A(Attribute): 49 | <48> Grandma | Made by | <45> Doughnuts |

This eliminates the need for tridbits <46> and <47>, which assigned the powdered attributes to Mom's doughnut preference. What's more, it becomes much easier to answer the question, "Who likes powdered doughnuts?" We just report the subjects of like events whose objects are powdered doughnuts.

There are different techniques for deciding how to choose to make a referent a general qualified concept, and how to recognize them. We could have made a general qualified concept for powdered doughnuts made by Grandma, but instead we made a subset of powdered doughnuts with the attribute of being made by Grandma.

When presented with a general concept that has an attribute being applied to it, the meaning engine 110 may select one of the following techniques for processing it.

1) Apply the attribute to the general concept. This assigns the attribute to all members of the category.

Assigning attributes to a category is what makes a category useful. Generally, one can tell from the grammar when the attribute is to be assigned to the category. For example, "Houses are buildings" or "Houses are used for shelter", uses a "to be" verb construction, which assigns attributes to a category. On the other hand, inserting an adjective in front of a concept, as in "Bruce likes brick houses", does not make all houses brick.

2) Change the scope from general to specific.

Some clauses provide sufficient information about a referent to change it from general to specific. For example "A cow needs water" can be interpreted to mean that any arbitrary cow needs water and, thus, all cows need water. But if we add the right clause, for example, "A cow that was left out in the pasture last night needs water", that cow now refers to a very specific animal.

3) Make a subset of the general concept and apply the attribute to the subset.

This prevents the attribute from being applied to all members of the category. When subsets with the same distinguishing attributes are used repeatedly, this method becomes inefficient for both tridbit usage and ease of processing. The last revision of Mom's doughnut preference assigned the "made by Grandma" attribute to a subset of powdered doughnuts.

4) Make a general qualified concept that is distinguished by the attribute.

This creates a new concept that is derived by taking the general concept and requiring that it also have the attribute being assigned. While choices 1, 2 and 3 will result in different meanings, the difference between choices 3 and 4 is more one of processing strategy. General qualified concepts may be the better choice when subsets with the same distinguishing attributes are used repeatedly. In the last revision of doughnut preferences, a general qualified concept for powdered doughnuts was created that could then be instantiated as a basis for future referents, including the doughnuts Mom likes.

Once a general qualified concept is established, it should be used consistently or information about powdered doughnuts could be stored under the general qualified concept as well as subsets of doughnuts with the attribute of being powdered.

When the meaning engine 110 is asked a question, it processes the sentence into a tridbit representation in the same manner as other statements. Questions express meaning in nearly the same way as a statement, they simply imply that the information should be acted upon in a different way than a statement. A question requests information.

The simple example diagrammed below is used to show how questions are represented.

1) The airplane was sold.

| R(Thing): 50 | Airplane | Category | Specific: 1 |
| R(Event): 51 | Sell | Category | Specific: 1 |
| A(Attribute): 52 | <50> Airplane | Object | <51> Sell |

This is a very simple statement conveying information about a specific sell event, which has a specific airplane as its object. Compare this with the question shown below that asks what was sold.

2) What was sold?

| R(Thing): 53 | ? | Inference | What |
|---|---|---|---|
| A(Attribute): 54 | <53> What | Object | <51> Sell |

Tridbit <53> shows a third type of referent. Instead of being defined by category or name, the referent in question 2 is inferred by the word "What". This referent acts as a placeholder that is used to assign information about the inferred referent. In this case, the question states that the inferred referent was sold, which is conveyed by the assert attribute in tridbit <54>. Notice that the target of tridbit <54>, Sell, points to the sell event from sentence 1. This reduction is necessary to answer the question, because the sell event in sentence 1 is the only one for which the object is known.

After establishing the referents and their relationships, the meaning engine 110 fills in inferred referents. If a qualifying referent is found, the ? in the inferred referent is filled in with the qualifying referent's ID, in this case, tridbit <50>. This tridbit, representing the airplane, qualifies because it is the object of the sell event that tridbit <54> asserts about the inference referent. The meaning engine 110 can then answer the question based on the completed tridbits. Note that pronouns are also inferred referents, which are filled in the same way, but do not require an answer.

Returning to FIG. 4, an assert attribute tridbit 400 may be modified to represent truth and certainty using the truth/certainty element 450. To express that a target does not possess an attribute value a truth value needs to be associated with the assertion. The truth portion may have a value of true, false or unknown. The truth value does not exactly correspond to what we mean when we ask, in every day speech, if something is true. We have an everyday notion that something is true if it corresponds to reality. For the meaning engine 110 to evaluate the whether an assertion corresponds to reality it must look at both the truth value and the certainty value of all such assertions in the knowledgebase 120, 130. The certainty value assigns a numeric rating indicating how likely it is that the indicated assertion, including the truth value, corresponds to reality. Consider the following tridbit in the knowledgebase 120 related to the statement "The grass is not green.":

| A(Attribute): 55 | < > Green | < > Color | < > Grass | False: 80 |
|---|---|---|---|---|

The truth value is false, and the tridbit is asserting the grass is not green with 80% certainty. If we had no other information about the color of grass, the answer to the question "Is it true that grass is green?" would be "probably not".

Thus, truth and certainty go hand in hand for assertions, much like scope and count do for referents. One result of having our everyday notion of truth represented by these two values might be a dual sense of what truth is. An assertion can only be true, false, or unknown, yet depending on how one's internal certainty rating operates, it might never be possible to obtain a 100% certainty that an assertion is true. The following sentences give additional examples of how the two concepts would be represented.

1) There is life on Mars. Truth=true, Certainty=100%
2) There is not life on Mars. Truth=false, Certainty=100%
3) No one knows if there is life on Mars. Truth=unknown, Certainty=100%
4) It is unlikely there is life on Mars. Truth=true, Certainty=low
5) There is almost certainly not life on Mars. Truth=false, Certainty=high
6) Its probably not known if there is life on Mars. Truth=unknown, Certainty=moderate Assigning a numeric rating to certainty adds the fuzziness present in everyday speech and reasoning. Speakers carefully choose their words to convey their level of certainty, i.e., "I sort of thought this might be true, but I'm not really sure". Listeners pick up on both the verbal clues and the reliability of the speakers to make subjective judgments about the certainty of the assertions being made.

Note that the meaning of sentences 4 and 5 are essentially the same. One rationale for storing truth/certainty within the assertion nugget is that unlike other attributes, truth/certainty values are required for all reasoning. One can reason about Mars without knowing its distance from the sun, unless of course the reasoning involves distance to the Sun. But you cannot reason about any assertion without knowing the assertion's truth and certainty.

The discussion will now turn to a specific detailed example illustrating how the meaning engine 110 processes a series of statements and questions to understand the meaning of the dialogue. The statements and questions used to illustrate the operation of the meaning engine 110 are:

1) June likes computers.
2) They are smarter than typewriters.
3) She drove the sporty gold car to the store that sells computers.
4) Who likes computers?
5) What color was the car?
6) Drive the red car to the store.

FIGS. 7-12 illustrate meaning maps 700, 800, 900, 1000, 1100, 1200 of these sentences, and are referred to as various aspects of the example are discussed. The elements of the meaning map 700 are described with reference to FIG. 7, the sentence "June likes computers." The layout of the meaning maps is the same for FIGS. 8-12. The words of the sentence are shown in a first column 705. The part of speech type, as defined in Table 3 below, is shown in boxes arranged in a second column 710. The referent tridbits 200 defined for the sentence are shown in a third column 715, and the assert attribute or comparison tridbits 400, 600 are sown in a fourth column 720. Syntax rules from the rules database 140, such as those provided in Table 7 below, used to create the tridbits 200, 400, 600 are depicted in ovals 725. The tridbit type, also defined in Table 3 below, is provided by a type indicator 730 located to the left of its associated tridbit.

When the meaning engine 110 receives the inputs (i.e., as text entered into an input box, or through a different interface), it reads the entire contents of the current input data, in this case all six sentences. The meaning engine 110 breaks the sentences into "chunks". In most cases, chunks are simply words. But a chunk can also be a string of words, such as "fire engine" where the concept is represented by its own referent tridbit 200, rather than being a qualified concept. An example of the latter would be "chocolate cake" where the concept can be represented by the referent for cake being qualified by a property of chocolate.

In the illustrated embodiment, the meaning engine 110 performs the chunking operation in real time, i.e., meaning is evaluated as each chunk is added, rather than waiting until all the chunks are in. This approach may not be used in all embodiments. In fact, if the first interpretation of a sentence does not make sense, the subsequent interpretations may be done with the pre-chunked sentence. The decisions made in a first pass have some nuances of not knowing what is coming next, and thus, can lead to interpretations that may be more human-like.

The meaning engine 110 looks up chunks in the dictionary 115. The dictionary 115 has an entry for each use of a word (or chunk). Table 2 below illustrates dictionary entries for the some of the words used in the example.

TABLE 2

Exemplary Dictionary Entries

| Word | partOfSpeech | Subtype | wordID | stemID | ConceptID | IntValue |
|---|---|---|---|---|---|---|
| are | V | 1 | 6342 | 3509 | 617 | <null> |
| are | V | 2 | 136734 | 136732 | 961 | 306 |
| car | N | 1 | 17835 | 17835 | 663 | 289 |
| color | N | 4 | 23685 | 23685 | 1003 | 289 |
| computers | N | 1 | 24545 | 24540 | 2567 | 290 |
| drive | N | <null> | 38330 | <null> | <null> | <null> |
| drive | V | 1 | 38331 | 38331 | 657 | <null> |
| drove | N | <null> | 38455 | <null> | <null> | <null> |
| drove | V | 1 | 38454 | 38331 | 657 | <null> |
| gold | A | 1 | 53654 | 53654 | 4587 | 1 |
| gold | N | <null> | 53655 | <null> | <null> | <null> |
| June | N | 1 | 136917 | 136917 | 5607 | 289 |
| June | N | 2 | 68595 | 68595 | 5604 | 265 |
| likes | N | <null> | 72350 | <null> | <null> | <null> |
| likes | V | 1 | 72351 | 72331 | 839 | 130 |
| red | A | 1 | 100512 | 100512 | 1005 | 1 |
| red | N | <null> | 100513 | <null> | <null> | <null> |
| red | V | <null> | 100511 | <null> | <null> | <null> |
| sells | V | 1 | 108390 | 108390 | 939 | <null> |
| she | A | 1 | 109523 | <null> | <null> | <null> |
| she | N | 3 | 109524 | 109524 | 1296 | 265 |
| smarter | A | 2 | 112389 | 112389 | 5533 | 0 |
| sporty | A | 1 | 136874 | 136874 | 4662 | 1 |
| store | N | 1 | 117188 | 117188 | 664 | 289 |
| store | V | 1 | 117189 | 117189 | 2919 | <null> |
| than | N | <null> | 122911 | <null> | <null> | <null> |
| than | T | <null> | 122912 | <null> | <null> | <null> |
| that | A | 1 | 122942 | <null> | <null> | <null> |
| that | N | <null> | 122944 | <null> | <null> | <null> |
| that | T | <null> | 122943 | <null> | <null> | <null> |
| the | T | <null> | 136726 | 0 | <null> | <null> |
| they | N | 3 | 123252 | 123252 | 1298 | 314 |
| to | T | <null> | 124515 | <null> | <null> | <null> |
| typewriters | N | 1 | 127928 | 127928 | 5534 | 290 |
| was | T | 1 | 136729 | 136744 | <null> | <null> |
| was | V | 1 | 133134 | 3509 | 617 | <null> |
| was | V | 2 | 133133 | 136732 | 961 | 137 |
| what | I | <null> | 134121 | <null> | <null> | <null> |
| what | N | 3 | 134119 | 134119 | 970 | 807 |
| what | T | <null> | 134120 | <null> | <null> | <null> |
| who | N | 3 | 134577 | 134577 | 1139 | 991 |

Word use is a concept very similar to part of speech. Word use is represented in the dictionary 115 by the combined value of fields labeled "partOfSpeech" and Subtype. Table 2 shows the dictionary entries that would be referenced in processing the example. Note that some word uses have not yet been trained, and therefore have fields with null and uninitialized values.

Because tridbits provides a model of what natural language means, rather than simply validating word order, a somewhat more functional grammatical categorization of words is required. The tridbit categorization starts with the premise that most words label phenomenon that are useful for humans to refer to. The phenomenon being labeled is called the referent, which is categorized into three categories: things, events and properties, which were described above.

The standard parts of speech: noun, verb and adjective correspond to the three types of referents. Noun, verb and adjective are retained as word use categories, although adverbs are included with adjectives in the tridbit classification system. Noun, verb and adjectives are further broken down in the tridbit word use classification as follows in Table 3:

Noun subcategories include:

| | |
|---|---|
| Thing category<br>Subtype = 1 | A thing category is the most common type of noun. In its general form, a thing category represents a category of things. Examples are rocks, cities, water, people or ideas. Because it is a category, one can refer to specific examples of a thing category, such as this rock, city, water, person or idea. Names used to refer to a specific thing, such as Florida, the Mississippi River or Patrick Henry, are proper nouns rather than thing categories because they only name a specific individual, not a category. Note that Floridians is a thing category because it represents a category of things, namely people who live in Florida. |
| Event category<br>Subtype = 5 | An event category is a noun that represents a category of events. Examples are dances, conversations, concerts, repairs, singing, thinking, meeting and many other nouns indicated by the plural or -ing form of a verb. The members of an event category are events. Events occur and have participants, typically a subject and object. In contrast, things simply exist. |

-continued

| | |
|---|---|
| Property category<br>Subtype = 4 | A property category is a noun that represents a category of properties. Examples are color, size, temperature or weight.<br>The members of a property category are properties. Properties describe an attribute of a thing or event, but do not exist on their own, such as red, blue, big, hot and heavy. |
| Assertion category<br>Subtype = 7 | An assertion category is a noun that represents a category of assertions. Examples are causes, reasons, results or beliefs.<br>The members of an assertion category are assertions of any type; attribute assertions or compare assertions. |
| Proper noun<br>Subtype = 2 | Proper nouns are names used to refer to specific things or events. Examples are Florida, the Mississippi River, Patrick Henry, Woodstock or the Rose Bowl.<br>Note that proper nouns never represent a general concept or category only specific things or events. Thus Floridians is a thing category because it represents a category of things, namely people who live in Florida. Likewise, French, American, Christian and Jew would be thing categories rather than proper nouns. |
| Pronoun (of various types)<br>Subtype = 3 and 6 | Pronouns are used to refer to something, without providing a name or category of the referent. They are "placeholders" that can serve a number of functions.<br>Shortcuts pronouns refer to something that has been mentioned previously in conversation or is otherwise understood through context. Examples are he, she, you, me, I, they and it.<br>Inquiry pronouns are resolved in a similar fashion to shortcut pronouns, however, the speaker is inquiring as to the identity of the referent, and therefore an answer is provided. Examples are who and what. |

Verb subcategories include:

| | |
|---|---|
| Event<br>Subtype = 1 | Most verbs are used as events, which refer to a specific event. Examples are give, laugh, drive, think, like and all forms of person and tense, such as give, gives, gave, given and giving.<br>The only time a verb that represents an event is not used as an event is when referring to the category of such events. In this case it is considered an event category, which is a type of noun, or in the case of subject property or object property described below |
| Other function<br>Subtype = 2 | The verb type other function, is given to those words that act like verbs in the language, but really don't refer to a specific event. Instead they perform other functions, such as the verb "is" assigning properties. "Have" may also fall into this category, but is currently handled as a standard event. |
| Subject property<br>Subtype = 3 | A subject property is the form of a verb that is used as an adjective to indicate the referent being described is the subject of the event. Examples are dancing, throwing, chewing, painting and knowing. Despite being used grammatically as adjectives, they still represent an event, and thus are categorized as a verb in the tridbit system. For example, in the phrase "a laughing clown," laughing is an event. It represents a laugh event of which the clown is the subject. |
| Object property<br>Subtype = 4 | An object property is the form of a verb that is used as an adjective to indicate the referent being described is the object of the event. Examples are thrown, chewed, painted and known. Despite being used grammatically as adjectives, they still represent an event, and thus are categorized as a verb in the tridbit system. For example, in the phrase "a tortured soul," tortured is an event. It represents a torture event of which the soul is the object. |

Adjective/Adverb subcategories include:

TABLE 3

Parts of Speech Classification

| | |
|---|---|
| Relative property<br>Subtype = 1 | Relative properties describe attribute values of a thing or event. Like all properties they do not exist on their own. Examples are bright, red, big, silly and heavy, as well as their superlatives brightest, reddest, biggest, etc. A relative property indicates the quantity or quality of an attribute relative to some norm, typically based on the category of the target. A grasshopper is big only compared to other grasshoppers.<br>Note that some words commonly considered adjectives are reclassified as verbs or nouns in the meaning engine's 110 word use categorization. For example in the phrase "hamster cage", hamster is considered a noun because hamster represents a category of things that exist. Similarly in the phrase "singing nun" singing is a verb because it represents a sing event. Also note that property categories, such as color, size, temperature or weight are a type of noun. |
| Compare operator<br>Subtype = 2 | Compare operators indicate a ranking within an attribute. Examples are more, better, brighter, redder, bigger, hotter and heavier. Comparative operators explicitly rank the target and value in compare tridbits. |
| Quantity<br>Subtype = 3 | Quantities names an amount, independent of any units. Examples include five, a third, ninety-nine and 5,467,892.45. |
| Date/Time<br>Subtype = 5 | Date/Time names a point in time. Examples include July 4, 1776, 6:00, tomorrow, noon or 11/2/2004 23:59. |
| Names/Enumerated | This category is still in development, but one or more additional categories will be required for properties that do not lend themselves to comparisons and other manipulations that can be done when the underlying attributes are scalar in nature. |

A final classification exists of words referred to as syntax tags that differ from the other word use categories in that they have no referent. The distinction between words that have referents and those that do not is more fundamental than the differences between the types of referents. Examples of syntax tags include the, a, of, that, to, etc. Rather than representing a thing, event or property, syntax tags provide information about the state and interaction of other things, events and properties in a sentence.

Figure 13:
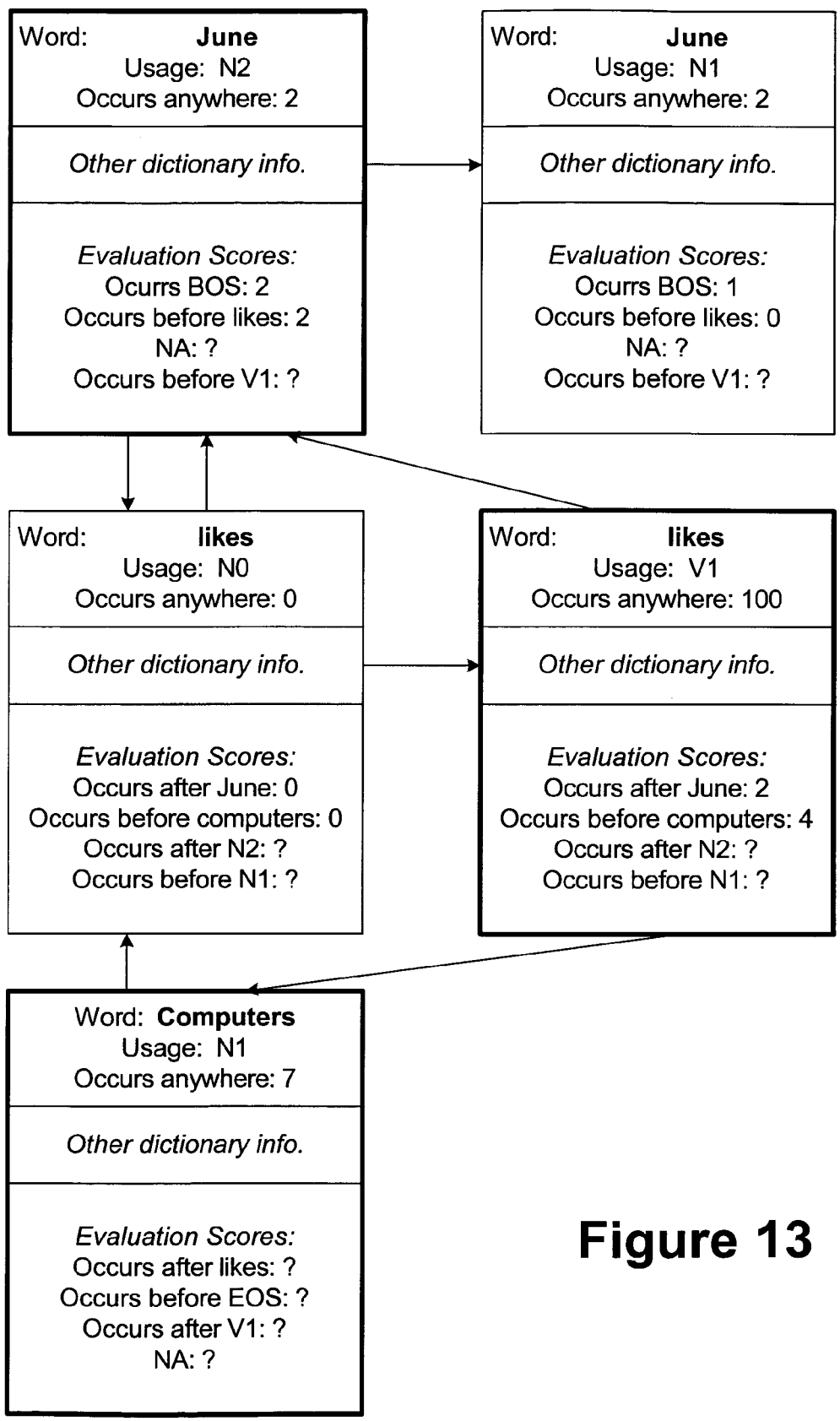
FIG. 13 is a diagram of a tree structure representing the sentence mapped in FIG. 7.

After looking up the chunk in the dictionary 115, an entry is made for each possible word use. This word use entry includes the information from the dictionary and adds an array of four evaluation scores. The entries are linked together to form the next row in a spindly tree structure. The resulting tree structures for the first sentence in the example are shown in FIG. 13.

In this particular tree structure the child and parent links always point to the head of the sibling list and only the chosen sibling (i.e., the word use) has a child link. However, this situation is an implementation detail that may vary in other implementations.

Initially, word use choice is based purely on past associations between each use of the word in question and the words occurring before and after this word. Theoretically, if the word uses chosen do not produce an interpretation of the sentence that makes sense, other choices can be tried until a sensible interpretation is found.

Because the initial word use choice evaluates the pairings of the current word with both the previous and next words, it can not take place until the next word is known. In the meantime, an entry is pushed onto a processing stack representing the word use that will be chosen in the future. The processing stack serves as a short term, working memory for detecting patterns and a stream of consciousness for the local knowledgebase 130. It is a FIFO stack whose entry structure is shown in Table 4 below:

TABLE 4

Processing Stack Entry Structure

| Field | Type | Description |
|---|---|---|
| psType | char | Word types: N = noun, V = verb, A = adj/adv, M = tag, * = unknown<br>Referent types: T = thing, E = event, P = property<br>Assertion types: S = attribute, C = compare<br>Miscellaneous: D = deleted, .?! = end of sentence (EOS) |
| MadeBy | integer | Word types: index to the chosen word use<br>EOS: −888<br>Other types: ID of the rule that created this entry |
| UsedBy | integer | ID of the rule that consumes this entry or 0 indicates entry not consumed<br>−1 indicates consumption not expected |
| psPtr | pointer | Word types: pointer to head of word use list<br>Other types: pointer to tridbit |
| RegUse | integer | Usability of the registries as follows:<br>0 - neither registry is useable<br>1 - Level 1 registry is useable<br>2 - Level 2 registry is useable<br>3 - Both registries are useable |
| Level1Rules | structure | Used to keep track of which level 1 rules have been tried |
| Level2Rules | structure | Used to keep track of which level 2 rules have been tried |

In contrast, the word use tree structure for a sentence is only needed during the parsing of the sentence. It does not store any longer term knowledge. By pushing a word entry of unknown type unto the processing stack, a task is set up that will re-evaluate this entry's word use each time a change is made to the processing stack, until a word use is chosen.

The actual evaluation takes place when word use lists for the words preceding and following the given word have been set up or sooner if there is only one word use to choose from. In the former case, the evaluation is based on which word use has a stronger record of occurring in the context of the neighboring words. The meaning engine 110 remembers which words have occurred together in the past by storing tridbits asserting the order of words in validated sentences. The meaning engine 110 may store occur counts in the word use tree structures shown in FIG. 13 based on retrieving this information from the global knowledgebase 120. Thus, in the first sentence, the meaning engine 110 initially chooses the proper noun word use of "June" (the name June), rather than the thing category use of "June" (the month June), because it has experienced the name June at the beginning of the sentence as well as the word liked occurring after it. There is no interpretation at this point. The meaning engine 110 cannot yet use its past experience of referents named June or like events, because the rules have not yet been applied to generate those tridbits.

When a word use choice is made, the stack entry is modified to reflect the choice. The change causes the stack to be processed for patterns that trigger syntax rules which in turn generate tridbits that are pushed back on the stack. Tables 5A-5J show the results of the events affecting the stack during the processing of the first sentence:

The word "June" with unknown word use is pushed on the process stack.

TABLE 5A

| MadeBy | UsedBy | psType | psPtr |
|---|---|---|---|
| 0 | 0 | * | ( )( ) June |
| −888 | 0 | T | ( )( ) −4&5 |

The word "likes" with unknown word use is pushed on the process stack.

TABLE 5B

| MadeBy | UsedBy | psType | psPtr |
|---|---|---|---|
| 0 | 0 | * | ( )( ) likes |
| 0 | 0 | * | ( )( ) June |
| −888 | 0 | T | ( )( ) −4&5 |

"June" is re-evaluated and categorized as a proper noun.

TABLE 5C

| MadeBy | UsedBy | psType | PsPtr |
|---|---|---|---|
| 0 | 0 | * | ( )( ) likes |
| −1 | 0 | N2 | ( )( ) June |
| −888 | 0 | T | ( )( ) −4&5 |

Rule 28 (described in greater detail below) is applied, generating a thing referent tridbit.

TABLE 5D

| MadeBy | UsedBy | psType | PsPtr |
|---|---|---|---|
| 0 | 0 | * | ( )( ) likes |
| 28.2 | 0 | T | ( )( ) −5&0<[DefRefT, r/name, S:1, N:5604, 109, 0.00, 11/23/2004 2:31:27, 1, 0]> |
| −1 | 28.2 | N2 | (70U,28A)( ) June |
| −888 | 0 | T | ( )( ) −4&5 |

The word "likes" is re-evaluated and categorized as an event verb.

TABLE 5E

| MadeBy | UsedBy | psType | PsPtr |
|---|---|---|---|
| −2 | 0 | V | ( )( ) likes |
| 28.2 | 0 | T | ( )( ) −5&0<[DefRefT, r/name, S:1, N:5604, 109, 0.00, 11/23/2004 2:31:27, 1, 0]> |
| −1 | 28.2 | N2 | (70U,28A) ( ) June |
| −888 | 0 | T | ( )( ) −4&5 |

The word "computers" with unknown word use is pushed on the process stack.

TABLE 5F

| MadeBy | UsedBy | PsType | PsPtr |
|---|---|---|---|
| 0 | 0 | * | ( )( ) computers |
| −2 | 0 | V | ( )( ) likes |
| 28.2 | 0 | T | ( )( ) −5&0<[DefRefT, r/name, S:1, N:5604, 109, 0.00, 11/23/2004 2:31:27, 1, 0]> |
| −1 | 28.2 | N2 | (70U,28A) ( ) June |
| −888 | 0 | T | ( )( ) −4&5 |

Rule 6 is applied, generating an event referent tridbit.

TABLE 5G

| MadeBy | UsedBy | PsType | PsPtr |
|---|---|---|---|
| 0 | 0 | * | ( )( ) computers |
| 6.3 | 0 | E | ( )( ) −6&0<[DefRefE, r/category, S:1, N:839, 10000082, 0.00, 11/23/2004 2:31:27, 1, 0]> |
| −2 | 6.3 | V | (6A)( ) likes |
| 28.2 | 0 | T | ( )( ) −5&0<[DefRefT, r/name, S:1, N:5604, 109, 0.00, 11/23/2004 2:31:27, 1, 0]> |
| −1 | 28.2 | N2 | (70U,28A) ( ) June |
| −888 | 0 | T | ( )( ) −4&5 |

The word "computers" is re-evaluated and categorized as a thing noun.

TABLE 5H

| MadeBy | UsedBy | PsType | psPtr |
|---|---|---|---|
| −1 | 0 | N1 | ( )( ) computers |
| 6.3 | 0 | E | ( )( ) −6&0<[DefRefE, r/category, S:1, N:839, 10000082, 0.00, 11/23/2004 2:31:27, 1, 0]> |
| −2 | 6.3 | V | (6A)( ) likes |
| 28.2 | 0 | T | ( )(57U,58A) −5&0<[DefRefT, r/name, S:1, N:5604, 109, 0.00, 11/23/2004 2:31:27, 1, 0]> |
| −1 | 28.2 | N2 | (70U,28A) ( ) June |
| −888 | 0 | T | ( )( ) −4&5 |

Rule 22 is applied, generating a thing referent tridbit.

TABLE 5I

| MadeBy | UsedBy | psType | psPtr |
|---|---|---|---|
| 22.6 | 0 | T | ( )( ) −7&0<[DefRefT, r/category, G:−100, N:2567, 122, 0.00, 11/23/2004 2:31:27, 1, 1701869908]> |
| −1 | 22.6 | N1 | (22A)( ) computers |
| 6.3 | 0 | E | ( )( ) −6&0<[DefRefE, r/category, S:1, N:839, 10000082, 0.00, 11/23/2004 2:31:27, 1, 0]> |

TABLE 5I-continued

| MadeBy | UsedBy | psType | psPtr |
|---|---|---|---|
| −2 | 6.3 | V | (6A)( ) likes |
| 28.2 | 0 | T | ( )(57U,58A) −5&0<[DefRefT, r/name, S:1, N:5604, 109, 0.00, 11/23/2004 2:31:27, 1, 0]> |
| −1 | 28.2 | N2 | (70U,28A) ( ) June |
| −888 | 0 | T | ( )( ) −4&5 |

Rule 47 is applied, generating two assert attribute tridbits.

TABLE 5J

| MadeBy | UsedBy | psType | psPtr |
|---|---|---|---|
| 47.9 | −1 | S | ( )( ) −10&0<[AAttrib, r/object, N:−6, N:2567, 000, 0.00, 11/23/2004 2:31:27, 1, 0]> |
| 47.9 | −1 | S | ( )( ) −8&0<[AAttrib, r/subject, N:−6, N:−5, 000, 0.00, 11/23/2004 2:31:27, 1, 0]> |
| 22.6 | 47.9 | T | ( )( ) −7&0<[DefRefT, r/category, G:−100, N:2567, 122, 0.00, 11/23/2004 2:31:27, 1, 1701869908]> |
| −1 | 22.6 | N1 | (22A)( ) computers |
| 6.3 | 47.9 | E | ( )( ) −6&0<[DefRefE, r/category, S:1, N:839, 10000082, 0.00, 11/23/2004 2:31:27, 1, 0]> |
| −2 | 6.3 | V | (6A)( ) likes |
| 28.2 | 47.9 | T | ( )(57U,58U,47A) −5&0<[DefRefT, r/name, S:1, N:5604, 109, 0.00, 11/23/2004 2:31:27, 1, 0]> |
| −1 | 28.2 | N2 | (70U,28A) ( ) June |
| −888 | 0 | T | ( )( ) −4&5 |

Table 5J depicts the processing stack after the first sentence, "June likes computers" has been processed. In this case the first pass of applying syntax rules yielded a sensible interpretation. Sensible interpretations have the following characteristics:

1) There are no loose ends, i.e., all the entries that are expected to be consumed have been used up as indicated by their UsedBy value.

2) Any assertions generated make sense.

3) Any referents that require reduction have been reduced.

If these conditions are not met, the meaning engine 110 backs out rules and makes another attempt to process the sentence until either a sensible interpretation is found or all possible interpretations have been tried. In the latter case, the best interpretation is used.

In this example sentence, the main processing produces the final interpretation, no post processing of the sentence is needed.

The entire processing stack corresponding to the sentences mapped in FIGS. 7-12 is provided below in Table 6.

TABLE 6

Processing Stack

| MadeBy | UsedBy | psType | psPtr |
|---|---|---|---|
| 51.10 | −1 | S | ( )( ) −60&0<[AAttrib, r/destination, N:−54, N:−28, 000, 0.00, 11/23/2004 18:01:51, 1, 0]> |
| 22.7 | 51.10 | D | ( )( ) −58&0<[DefRefT, r/category, S:1, N:664, 121, 0.00, 11/23/2004 18:01:51, 1, 0]> |
| −1 | 22.7 | N1 | (22A)( ) store |
| −1 | 41.8 | M0 | (41A)( ) the |

TABLE 6-continued

Processing Stack

| MadeBy | UsedBy | psType | psPtr |
|---|---|---|---|
| −1 | 51.10 | M0 | ( )(51A) to |
| 38.4 | −1 | S | ( )( ) −57&0<[AAttrib, r/property N:−56, N:1005, 000, 0.00, 11/23/2004 18:01:51, 1, 0]> |
| 53.9 | −1 | S | ( )( ) −59&0<[AAttrib, r/object, N:−54, N:−56, 000, 0.00, 11/23/2004 18:01:51, 1, 0]> |
| 22.3 | 53.9 | T | ( )( ) −56&0<[DefRefT, r/category, S:1, N:663, 121, 0.00, 11/23/2004 18:01:51, 1, 1701869908]> |
| −1 | 22.3 | N1 | (22A)( ) car |
| 31.2 | 38.4 | D | (38A)( ) −55&0<[DefRefP, r/category, G:−100, N:1005, 10000000, 1854.00, 11/23/2004 18:01:51, 1, 0]> |
| −2 | 31.2 | A | (31A)( ) red |
| −1 | 41.5 | M0 | (41A)( ) the |
| 6.1 | 53.9 | E | ( )(53A) −54&0<[DefRefE, r/category, S:1, N:657, 10000000, 0.00, 11/23/2004 18:01:51, 1, 0]> |
| −2 | 6.1 | V | (6A)( ) Drive |
| −888 | 0 | ? | ( )( ) nil |
| 33.11 | −1 | S | ( )( ) −52&0<[AAttrib, r/property, N:−23, N:−46, 000, 0.00, 11/23/2004 18:01:38, 1, 0]> |
| 22.7 | 33.11 | D | ( )( ) −51&0<[DefRefT, r/category, S:1, N:663, 121, 0.00, 11/23/2004 18:01:38, 1, 0]> |
| −1 | 22.7 | N1 | (22A)( ) car |
| −1 | 41.8 | M0 | (41A)( ) the |
| 53.6 | 33.11 | D | ( )( ) −50&0<[DefRefE, r/category, S:1, N:961, 20000089, 0.00, 11/23/2004 18:01:37, 1, 0]> |
| −2 | 53.6 | V | (6A)( ) was |
| 41.5 | −1 | S | ( )( ) −47&0<[AAttrib, r/category, N:−46, N:1003, 000, 0.00, 11/23/2004 18:01:37, 1, 0]> |
| 41.5 | 33.11 | P | ( )(66U,113U,33A) −46&0<[DefRefP, r/Inquiry, W:color, M:−53, 10000000, 0.00, 11/23/2004 18:01:37, 1, 0]> |
| −1 | 41.5 | N4 | ( )( ) color |
| −1 | 41.5 | N3 | (119U,26U,40A)( ) What |
| −888 | 0 | ? | ( )( ) nil |
| 33.11 | −1 | S | ( )( ) −45&0<[AAttrib, r/object, N:−6, N:2567, 000, 0.00, 11/23/2004 18:01:31, 1, 0]> |
| 33.11 | −1 | S | ( )( ) −44&0<[AAttrib, r/subject, N:−6, N:−41, 000, 0.00, 11/23/2004 18:01:31, 1, 0]> |
| 41.8 | 33.11 | D | ( )( ) −43&0<[DefRefP, r/category, G:−100, N:2567, 122, 0.00, 11/23/2004 18:01:31, 1, 0]> |
| −1 | 41.8 | N1 | (22A)( ) computers |
| 41.5 | 33.11 | D | ( )( ) −42&0<[DefRefE, r/category, S:1, N:839, 10000082, 0.00, 11/23/2004 18:01:31, 1, 656746272]> |
| −2 | 41.5 | V | (6A)( ) likes |
| 38.4 | 33.11 | T | ( )(57U,58U,47A) −41&0<[DefRefT, r/Inquiry, W:who, M:−5, 3DF, 0.00, 11/23/2004 18:01:31, 1, 661877349]> |
| −1 | 38.4 | N3 | (119U,26A)( ) Who |
| −888 | 0 | . | ( )( ) nil |
| 59.29 | −1 | S | ( )( ) −40&0<[AAttrib, r/object, N:−31, N:2567, 000, 0.00, 11/23/2004 18:01:28, 1, 0]> |
| 59.29 | −1 | S | ( )( ) −39&0<[AAttrib, r/subject, N:−31, N:−28, 000, 0.00, 11/23/2004 18:01:28, 1, 0]> |
| 22.21 | 59.29 | D | ( )( ) −32&0<[DefRefT, r/category, G:−100, N:2567, 122, 0.00, 11/23/2004 18:01:24, 1, 0]> |
| −1 | 22.21 | N1 | (22A)( ) computers |
| 6.19 | 59.29 | E | ( )( ) −31&0<[DefRefE, r/category, S:1, N:939, 10000000, 0.00, 11/23/2004 18:01:24, 1, 0]> |
| −1 | 6.19 | V1 | (6A)( ) sells |
| −2 | 59.29 | M | ( )(56U,59A) that |
| 51.27 | −1 | S | ( )( ) −38&0<[AAttrib, r/destination, N:−19, N:−28, 000, 0.00, 11/23/2004 18:01:28, 1, 0]> |
| 22.16 | 51.27 | T | ( )( ) −28&0<[DefRefT, r/category, S:1, N:664, 121, 0.00, 11/23/2004 18:01:24, 1, 0]> |
| −1 | 22.16 | N1 | (22A)( ) store |
| −1 | 41.17 | M0 | (41A)( ) the |
| −1 | 51.27 | M0 | ( )(51A) to |
| 38.13 | −1 | S | ( )( ) −24&0<[AAttrib, r/property, N:−23, N:4587, 000, 0.00, 11/23/2004 18:01:23, 1, 0]> |
| 38.14 | −1 | S | ( )( ) −27&0<[AAttrib, r/property, N:−23, N:4662, 000, 0.00, 11/23/2004 18:01:23, 1, 943009842]> |
| 47.26 | −1 | S | ( )( ) −37&0<[AAttrib, r/object, N:−19, N:−23, 000, 0.00, 11/23/2004 18:01:28, 1, 0]> |
| 47.26 | −1 | S | ( )( ) −36&0<[AAttrib, r/subject, N:−19, N:−5, 000, 0.00, 11/23/2004 18:01:28, 1, 0]> |
| 22.12 | 47.26 | T | ( )( ) −23&0<[DefRefT, r/category, S:1, N:663, 121, 0.00, 11/23/2004 18:01:23, 1, 1701869908]> |
| −1 | 22.12 | N1 | (22A)( ) car |
| 33.11 | 38.13 | D | (38A)( ) −22&0<[DefRefP, r/category, G:−100, N:4587, 10000000, 3426.00, 11/23/2004 18:01:23, 1, 0]> |
| −1 | 33.11 | A1 | (31A)( ) gold |
| 41.8 | 38.14 | D | (38A)( ) −20&0<[DefRefP, r/category, G:−100, N:4662, 10000000, 0.00, 11/23/2004 18:01:23, 1, 0]> |
| −1 | 41.8 | A1 | (31A)( ) sporty |
| −1 | 41.15 | M0 | (41A)( ) the |
| 41.5 | 47.26 | E | ( )( ) −19&0<[DefRefE, r/category, S:1, N:657, 10000000, 0.00, 11/23/2004 18:01:23, 1, 0]> |
| −1 | 41.5 | V1 | (6A)( ) drove |
| 38.4 | 47.26 | D | ( )(57U,58U,47A) −18&0<[DefRefT, r/Inferent, W:she, M:−5, 109, 0.00, 11/23/2004 18:01:23, 1, 0]> |
| −2 | 38.4 | N | (119U,26A)( ) She |
| −888 | 0 | . | ( )( ) nil |
| 51.10 | −1 | C | ( )( ) −17&0<[ACompare, r/smarter, N:−7, N:5534, 000, 0.00, 11/23/2004 18:01:18, 1, 0]> |
| 41.8 | 51.10 | D | ( )( ) −16&0<[DefRefT, r/category, G:−100, N:5534, 122, 0.00, 11/23/2004 18:01:18, 1, 0]> |

TABLE 6-continued

Processing Stack

| MadeBy | UsedBy | psType | psPtr |
|---|---|---|---|
| −1 | 41.8 | N1 | (22A)( ) typewriters |
| −2 | 51.10 | M | ( )( ) than |
| 53.6 | 51.10 | D | ( )( ) −15&0<[DefRefP, r/category, G:−100, N:5533, 20000000, 150000.00, 11/23/2004 18:01:18, 1, 0]> |
| −1 | 53.6 | A2 | (31A)( ) smarter |
| 41.5 | 51.10 | E | ( )( ) −14&0<[DefRefE, r/category, S:1, N:961, 20000132, 0.00, 11/23/2004 18:01:18, 1, 0]> |
| −2 | 41.5 | V | (6A)( ) are |
| 38.4 | 51.10 | D | ( )(34U,118A) −13&0<[DefRefT, r/Inferent, W:they, M:−7, 13A, 0.00, 11/23/2004 18:01:18, 1, 658727]> |
| −1 | 38.4 | N3 | (119U,26A)( ) They |
| −888 | 0 | . | ( )( ) nil |
| 53.9 | −1 | S | ( )( ) −10&0<[AAttrib, r/object, N:−6, N:2567, 000, 0.00, 11/23/2004 18:01:10, 1, 0]> |
| 53.9 | −1 | S | ( )( ) −8&0<[AAttrib, r/subject, N:−6, N:−5, 000, 0.00, 11/23/2004 18:01:10, 1, 0]> |
| 53.6 | 53.9 | D | ( )( ) −7&0<[DefRefT, r/category, G:−100, N:2567, 122, 0.00, 11/23/2004 18:01:10, 1, 0]> |
| −1 | 53.6 | N1 | (22A)( ) computers |
| 22.3 | 53.9 | E | ( )( ) −6&0<[DefRefE, r/category, S:1, N:839, 10000082, 0.00, 11/23/2004 18:01:10, 1, 656746272]> |
| −2 | 22.3 | V | (6A)( ) likes |
| 31.2 | 53.9 | T | ( )(57U,58U,47A) −5&0<[DefRefT, r/name, S:1, N:5604, 109, 0.00, 11/23/2004 18:01:10, 1, 656746272]> |
| −1 | 31.2 | N2 | (70U,28A)( ) June |
| −888 | 0 | T | ( )( ) −4&5<[DefRefT, r/category, C:It, N:1, 000, 0.00, 8/31/2003 17:05:02, 1, 0]> |

Figure 14:
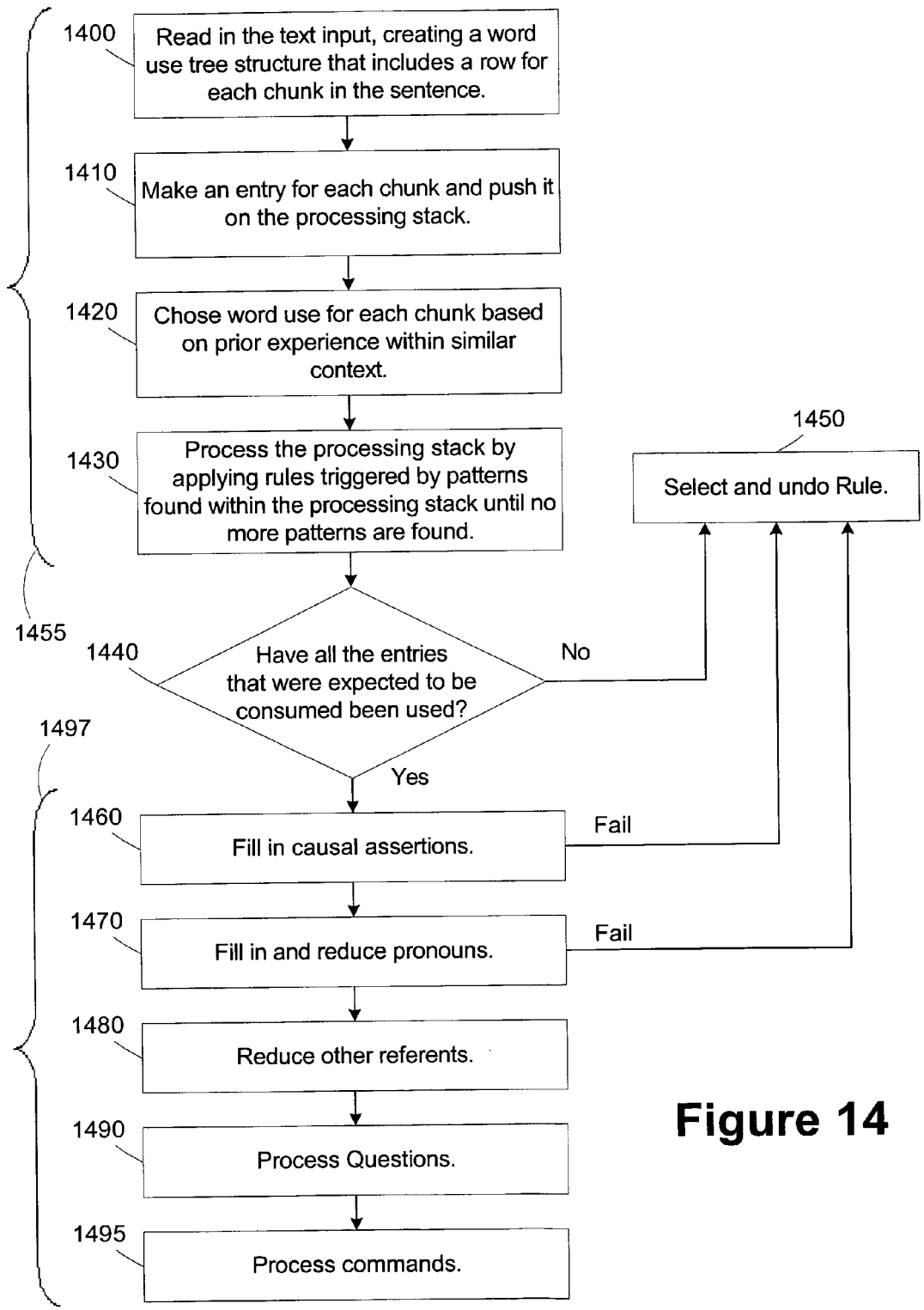
FIG. 14 is a simplified flow diagram of processing phases employed by a meaning engine in the system of FIG. 1.

Turning now to FIG. 14, a simplified flow diagram of the processing phases employed by the meaning engine 110 is illustrated. Blocks 1400-1450 represent a main processing phase 1455 implemented by the meaning engine 110 blocks 1460-1495 represent a post-processing phase 1497.

The implementation of blocks 1400-1420 have been discussed above. In block 1400, the text input is read and a word use tree structure is created that includes a row for each chunk in the sentence. In block 1410, an entry for each chunk it created and pushed on the processing stack. In block 1420, word use is chosen for each chunk based on prior experience within similar context.

The order in which the functions in the main processing phase 1455 take place is not necessarily linear as shown in FIG. 14. The functions in blocks 1420 and 1430 are triggered by changes in the processing stack, which can result from blocks 1410, 1420, or 1430.

The operation of block 1430 detects patterns within the processing stack and triggers the application of syntax rules. The syntax rules and the patterns that trigger them are defined in the rules database 140 separate from the global knowledgebase 120. Storing and accessing the dictionary 115, global knowledgebase 120, and the rules database 140 may be handled using a conventional relational database, such as InterBase® offered by Borland Software Corporation of Scotts Valley, Calif.

The structure and current contents of the syntax rule table in the rules database 140 is shown below in Table 7. The example rules shown in Table 7 do not represent an exhaustive list of syntax rules for English. Other rules may be developed based on the particular implementation and application.

TABLE 7

Syntax Rules

| RuleID | Pattern | Consume | Associate List | Clausal Type | Clausal Pos | Level | Description |
|---|---|---|---|---|---|---|---|
| 6 | >V | Y | <611> | — | 0 | 1 | |
| 22 | >N1 | Y | <782> | — | 0 | 1 | |
| 26 | >N3 | Y | <790> | — | 0 | 1 | |
| 27 | =a>T | YN | <859> | — | 0 | 1 | |
| 28 | >N2 | Y | <886> | — | 0 | 1 | |
| 31 | >A | Y | <988> | — | 0 | 1 | |
| 38 | >P1>T | YN | <1108> | — | 0 | 1 | |
| 40 | >N3>N4 | YY | <1210><1209> | — | 0 | 1 | |
| 41 | =the>T | YN | <1211> | — | 0 | 1 | |
| 45 | >N4 | Y | <1514> | — | 0 | 1 | |
| 46 | >N3>N1 | YY | <1521><1209> | — | 0 | 1 | |
| 70 | >N2 | Y | <3065> | — | 0 | 1 | |
| 72 | =do>N3 | YY | <4012> | — | 0 | 1 | |
| 82 | =how=many | YY | <4931><4930> | — | 0 | 1 | Produces: <DefRefP ?> <AAttrib Category P-1 Quantity> |
| 90 | >N5 | Y | <5232> | — | 0 | 1 | Produces: <DefRefE Category U0 U0> Example: running |

TABLE 7-continued

Syntax Rules

| RuleID | Pattern | Consume | Associate List | Clausal Type | Clausal Pos | Level | Description |
|---|---|---|---|---|---|---|---|
| 119 | >N3 | Y | <5558> | — | 0 | 1 | Produces: <DefRefTenvirons U0 U0> Example: It [is raining] |
| 33 | >P1>E2>T | YYY | <992> | . | 0 | 2 | Produces: <AAttrib Property P3 P1> Example: What size is Jumbo? |
| 34 | >T>E2>P % | YYY | <993> | . | 0 | 2 | Produces: <AAttrib Property P1 P3> Example: Jumbo is small |
| 43 | >T>E2>T | YYY | <1355> | . | 0 | 2 | Produces: <AAttrib Category P1 P3> Example: Jumbo is a elephant |
| 47 | >T>E1>T | YYY | <5060><5061> | . | 0 | 2 | Produces: <AAttrib Subject P2 P1><AAttrib Object P2 P3> Example: I drink tea |
| 51 | =to>T | YY | <5217> | E | 65552 | 2 | The car that Jeff drove to the store that sold electronics crashed. |
| 53 | >E1>T | YY | <5246> | ^ | 0 | 2 | Produces: <AAttrib Object P1 P2> Example: activate the lamp |
| 54 | =that>T>E1 | YYY | <5220><5221> | T | 65536 | 2 | Produces: <AAttrib Object P3 P0><AAttrib Subject P3 P2> Example: that Jeff drove |
| 55 | >T>T>E1 | YYY | <5272><5221> | . | 0 | 2 | Produces: <AAttrib Object P3 P1><AAttrib Subject P3 P2> Example: The car Paul likes |
| 56 | =that>E1 | YY | <5222> | T | 16842752 | 2 | Produces: <AAttrib Subject P2 P0> Example: that crashed |
| 57 | >T>E1 | YY | <5274><5060> | T | 65536 | 2 | Produces: <AAttrib Object P2 P0><AAttrib Subject P2 P1> Example: [The car] Fred drives ... |
| 58 | >T>E1 | YY | <5060> | . | 0 | 2 | Produces: <AAttribSubject P2 P1> Example: Karen laughs |
| 59 | =that>E1>T | YYY | <5222><5061> | T | 65536 | 2 | Produces: <AAttrib Subject P2 P0><AAttrib Object P2 P3> Example: that sold electronics |
| 60 | >T>E2>E4 | YYY | <5272> | . | 0 | 2 | Produces: <AAttrib Object P3 P1> Example: What was given? |
| 61 | >T>E1>T>T | YYYY | <5060><5251><5252> | . | 0 | 2 | Produces: <AAttrib Subject P2 P1><AAttrib Recipient P2 P3><AAttrib Object P2 P4> Example: Ian gave Emma the ball |
| 62 | =for>E3 | YY | <5233> | E | 16777216 | 2 | Produces: <AAttrib Purpose P0 P2> Example: for running |
| 63 | =off>T | YY | <5239> | T | 65536 | 2 | Produces: <AAttrib Contents P0 P2> Example: of coffee |
| 65 | >T>E2>P1 | YYY | <5260> | . | 0 | 2 | Produces: <AAttrib P1 U0 P3> Example: The color is purple |
| 66 | >P1>E2>T | YYY | <5261> | . | 0 | 2 | Produces: <AAttrib P3 U0 P1> Example: Purple is the color |
| 67 | >T>E2>T | YYY | <5262> | . | 0 | 2 | Produces: <AAttrib P1 U0 P3> Example: The capital is Madison |
| 68 | >T>E2>T | YYY | <5263> | . | 0 | 2 | Produces: <AAttrib P3 U0 P1> Example: What is the capital? |

TABLE 7-continued

Syntax Rules

| RuleID | Pattern | Consume | Associate List | Clausal Type | Clausal Pos | Level | Description |
|---|---|---|---|---|---|---|---|
| 69 | >E4 | Y | <5243> | T | 65536 | 2 | Produces: <AAttrib Object P1 P0> Example: scorned |
| 71 | >T>E2>T | YYY | <5264> | . | 0 | 2 | Produces: <AAttrib Equivalent P1 P3> Example: Who is he? |
| 75 | >P3>T | YN | <4874> | — | 0 | 2 | Produces: <AAttrib Quantity P2 P1> Example: eight legs |
| 76 | >P3>E2>P2 | YYY | <5254> | . | 0 | 2 | Produces: <ACompare P3 P1 U0> Example: Five is more |
| 77 | =than>P3 | YY | 0, −3 | C | 65536 | 2 | |
| 78 | >E2>P3>P2 | YYY | <4912> | . | 0 | 2 | Produces: <ACompare P3 P2 U0> Example: Is five more? |
| 80 | >E2>T>P2 | YYY | <4912> | . | 0 | 2 | Produces: <ACompare P3 P2 U0> Example: Is 3 cats more? |
| 81 | =than>T | YY | 0, −3 | C | 65536 | 2 | |
| 83 | >E1>T>P1 | YYY | <784><5018> <5015> | ^ | 0 | 2 | Produces: <AAttrib Object P1 P2><AAttrib Property P2 P3><AAttrib Result P1 P-2> Example: Turn the lamp on |
| 84 | >E1>P1>T | YYY | <5205><5206> <5207> | ^ | 0 | 2 | Example: Switch on the lamp |
| 85 | >P2>T | YY | <5216> | T | 65536 | 2 | Produces: <ACompare P1 P1 P0> Example: above the shelf |
| 100 | >T=of>T>E2>P1 | YYYYY | <5255> | . | 0 | 2 | Produces: <AAttrib P1 P3 P5> Example: The color of the dress is blue |
| 106 | >T>P1 | NY | <5265> | — | 0 | 2 | Produces: <AAttrib LastName P1 P2> Example: Matt Peterson |
| 110 | >T=of>T | YYY | <5276><5275> | — | 0 | 2 | Produces: <DefRefT Inferent S1 M0><AAttrib P1 P3 P-1> Example: the capital of Wisconsin |
| 111 | >T>E1>P1 | YYY | <5060><5061> | . | 0 | 2 | Produces: <AAttrib Subject P2 P1><AAttrib Object P2 P3> Example: Matt likes blue |
| 112 | >T>E2>P1 | YYY | <5264> | . | 0 | 2 | Produces: <AAttrib Equivalent P1 P3> Example: What is the color of the dress? |
| 113 | >P1>E2>T | YYY | <5264> | . | 0 | 2 | Produces: <AAttrib Equivalent P1 P3> Example: Volume of the radio is what? |
| 114 | >T>E2>P2>T | YYYY | <5337> | — | 0 | 2 | Produces: <ACompare P3 P4 P1> Example: The television is above the shelf |
| 115 | >P1>E1 | YN | <1108> | — | 0 | 2 | Produces: <AAttrib Property P2 P1> Example: domestic use |
| 117 | >E3>T | YN | <5365> | — | 0 | 2 | Produces: <AAttrib Subject P1 P2> Example: living things |
| 118 | >T>E2>P2=than>T | YYYYY | <5549> | — | 0 | 2 | Produces: <ACompare P3 P1 P5> Example: They are smarter than typewriters |

The set of syntax rules may change or grow as the meaning engine 110 is trained or "learns." The meaning engine 110 allows the user to pick out patterns in a sentence and construct a tridbit representation for the pattern. If the meaning engine 110 does not already have this pairing in its syntax rules, a new rule is created. Longer and more context specific rules may be useful in using the rules backwards to generate natural language to express complex information represented by tridbits.

The first thing to understand about syntax rule application is how patterns are detected within the processing stack. Looking back at Table 5C, it depicts the processing stack while processing the first sentence "June likes computers" at the point just before the first rule is applied. The stack is walked starting at the first entry after the beginning of sentence marker (MadeBy=−888). A string is generated that represents the grammatical types of all the entries that are expected to be consumed (UsedBy=0). In this case the pattern in the processing stack would be:

>N2=*

The first token ">N2" represents the entry for the word "June", which was categorized as a noun of subtype 2. The ">" symbol indicates that this token is being represented by category.

The second token "=*" represents the entry for the word "likes", which has not yet been categorized. The "=" symbol indicates the token must be matched literally. Tag words like "the" or "of" are matched literally and thus would appear in a pattern as "=the" or "=of".

A pattern that includes an uncategorized word is not processed until all words within the pattern are categorized. So it is actually at the point just before the word "likes" is categorized as a V1 that the rule is applied. At this point the pattern in the processing stack looks like:

>N2

The fact that a V1 is about to follow is used to detect whether a longer rule might apply which would delay the processing. In this case, no longer rule exists that has a pattern that starts with ">N2>V1". There are two rules that have the pattern ">N2". These are considered applicable rules and noted by the meaning engine 110 in a rule registry, which simply keeps track of which rules have been applied thus far.

An evaluation is done to determine which rule to try first. This evaluation is based on seeing which rule has in the past been applied more often in similar contexts. If the rule does not produce sensible results, it will be backed out and other applicable rules tried until all possible combinations have been tried on the sentence.

Level 1 rules, which result in the generation of one or more referent tridbits, are always tried before level 2 rules. Level 2 rules consume referent tridbits.

In the current example, the two rules that apply are:

Rule 28—Interprets a proper noun as representing a thing referent which is defined by name.

Rule 70—Interprets a proper noun as representing a property which is the proper name.

Rule 28 would apply to "Tom" in the sentence "Tom is his father" because Tom refers to a person. Rule 70 would apply to "Tom" in the sentence "Tom is his name" because Tom refers to a name.

The meaning engine 110 selects rule 28. This selection makes the processing more efficient since backtracking is not required. If rule 70 had been chosen first, the results would, sooner or later, fail to make sense. Eventually rule 28 would be tried and the correct interpretation would be made, but more time would be required.

The AssociateList field in the syntax rule table is a list of tridbits that direct what happens when the rule is applied. These tridbits can specify the generation of referent or assertion tridbits using values from the pattern. Less commonly they can modify values in existing tridbits, which is how "the" and "a" function.

The AssociateList of rule 28 contains one tridbit, whose ID is 886. Tridbit 886, shown below, is a generation tridbit, i.e., it specifies a tridbit to generate.

| Tridbit ID 886 | Tridbit Type 12 | Attribute Type N |
|---|---|---|
| Attribute ID 2826 | Target Type S | Target ID 1 |
| Value Type P | ValueID 1 | IntValue 273 |

The resulting tridbit has the same values as the generation tridbit, except it will be the corresponding type of non-generation tridbit. In addition, if the attribute, target or value types are "P", the value for those elements will be filled in from the pattern in the following manner. The tokens in the pattern are numbered sequentially starting at 1. If an element's type is "P", it will be replaced with a tridbit value based on the Nth token of the pattern that triggered the rule, where N is the element ID. Thus in the example, the value element will be replaced with a tridbit value based on the first token in the pattern, which is the proper noun "June". This tridbit value will be the concept ID associated with the N2 word use of June, which has the ID of 5604. Tridbit 5604 represents the general concept of the name June. This generates the tridbit shown below:

| Tridbit ID | Tridbit Type 2 | Attribute Type N |
|---|---|---|
| Attribute ID 2826 | Target Type S | Target ID 1 |
| Value Type N | ValueID 5604 | IntValue 273 |

Unlike the tridbit that generated it, the tridbit above only resides in memory, which is why it has no tridbit ID. Table 5D depicts this generated tridbit with a unique memory ID of −5. A tridbit ID is assigned if and when the tridbit is stored in the global knowledgebase 120.

A generation tridbit with an element value of P0, specifies that the element be replaced with the clausal referent. The clausal referent is a tridbit that the pattern refers to, but is outside of the pattern. For example, in the sentence "Meg dislikes computers that crash," the final clause, "that crash" is a pattern that matches rule 56. Rule 56 invokes the following generation tridbit:

| Tridbit ID 5222 | Tridbit Type 11 | Attribute Type N |
|---|---|---|
| Attribute ID 1579 | Target Type P | Target ID 2 |
| Value Type P | ValueID 0 | IntValue 0 |

An assert attribute tridbit is generated that asserts the subject of the crash event is the clausal referent. The ClausalType field in the rule entry specifies what type of tridbit the clausal referent must be. The ClausalPos field stores previous experience as to the position of the clausal referent in relation to the pattern. A clausal referent is selected that conforms to this information and makes sense. Sometimes this selection cannot be done immediately, and is done during the post-processing phase 1497.

Any assertion tridbit that is generated must be checked to see that it makes sense. Because the structure of a tridbit, especially an assert attribute tridbit 400, is highly constrained, a variety of checks can be done on an assert attribute tridbit 400 to test whether it makes sense structurally. The structure and use of tridbits to represent meaning is discussed in detail above. The fundamental constraints of an assert attribute tridbit 400 are shown in FIG. 5.

Based on this fundamental structure for the assert attribute tridbit 400, the following tests are performed to validate an assert attribute tridbit 400:

At least two of the elements 420, 430, 440 must have values.

2) The attribute element 430 must be an attribute of the target.

3) The asserted value element 420 is capable of membership in the attribute category.

4) If category is the attribute, the target must be capable of membership in the value category.

5) If category is the attribute, it can not also be the target or value.

6) If equivalence is the attribute, the target and value must be of the same type, scope and count.

7) Equivalencing of categories of properties is suspect.

Similarly, constraints can be applied to a assert comparison tridbit 600, such as requiring that the compare operator be applicable to both the target and value.

These structural tests can detect "structural nonsense", such as "The color of the dress is Texas." This specific example fails because color, which is the attribute, is a category of properties and Texas is a thing referent rather than a property and therefore can not be a member of the color category. It is not necessary to know what these words mean in a deep way in order to recognize the sentence as nonsense.

However, "unrealistic nonsense", such as "The dog drove", will pass the structural test. "The dog drove" generates an assert attribute tridbit 400 that asserts the subject of the drive event is the dog. Each of the structural tests are met: subject is an attribute of drive events, dogs can be subjects of events, especially bark events and so forth. It takes a more in depth knowledge of the world to know that dogs can not drive. To judge the reality of a sentence, the assertions it makes must be compared with previous knowledge of the concepts involved to see if the information is confirmed or contradicted. The simple, well-defined structure of information in the tridbit model facilitates these types of evaluations.

If the rule is successfully applied and all the tridbits it generates make sense, it will consume the entries that generated the pattern according to the Consume field in the rule entry. The Consume field simply contains a sequence of Ys and Ns that correspond to each token of the pattern. If the token's Consume character is Y, the entry will be consumed. To consume an entry, the UsedBy field of the entry is filled with the ID of the rule consuming it.

Phase 1 processing 1455 continues until the end of the sentence is reached and no more patterns can be detected in the processing stack. At this point an evaluation of whether the sentence has been processed successfully is done. This evaluation is depicted in block 1440 of the flowchart in FIG. 14.

The major criterion in this evaluation is whether all of the entries that were expected to be consumed have been used. If there are unused entries on the stack, alternative processing is tried by finding patterns where alternative rules could have been used, backing out the rule that was applied and trying the alternatives, until a successful parse is achieved or no alternative processing is left. In the latter case, the parse with the fewest unused entries will be the interpretation.

In addition, a successful interpretation is expected to have one main theme. If a syntax rule generates the main theme of a statement, the value of the ClausalType field in the rule's entry is '.'. Some syntax rules specifically express the main theme of a command and are thus indicated by a "^" in the ClausalType field. A sentence without a main theme is a fragment.

After a sentence is successfully processed in the main processing phase 1455, the post-processing phase 1497 is begun. During post processing the tridbits generated in the main processing phase 1455 undergo five separate processing passes to accomplish the following:

Block 1460: Fill in clausal assertions
Block 1470: Fill in and reduce pronouns
Block 1480: Reduce other referents
Block 1490: Process questions
Block 1495: Process commands The first post processing function, depicted in block 1460 of FIG. 14, fills in clausal referents. As discussed previously, a clausal referent is a tridbit that a syntax rule refers to, but is outside of the pattern that triggered it. Many times this referent can be identified while the rule is being processed as in the example "Meg dislikes computers that crash," where "computers" is the clausal referent of "that crash".

In other cases, such as "To the finish line John raced," the clausal referent of "to the finish line" has not even been encountered when the rule is processed. When a rule generates a tridbit that refers to the clausal referent, but the clausal referent can not be determined, the tridbit is still generated. The element that was to be replaced with the clausal referent is encoded to indicate the type of clausal referent that needs to go there. In this example, "to the finish line" generates a tridbit that asserts the destination of an event type clausal referent is the finish line. The post processing that takes place in block 1460, finds these unresolved clausal referents and fills them in, in this case with the race event.

The second post processing function, depicted in block 1470 of FIG. 14, fills in and reduces pronouns. Pronouns generate referents that act as placeholders. The actual or originating referent is inferred by context. The type of pronoun determines how the originating referent is resolved.

A first person pronoun, such as I or me, always refers to the speaker. When the meaning engine 110 initializes, the user interacting with the language processing system 100 is required to log in. The meaning engine 110 generates a tridbit to represent the person with whom it is speaking. This speaker tridbit becomes the originating referent for first person pronouns.

Second person pronouns refer to the audience to whom the speaker is speaking, in this case the meaning engine 110. When the meaning engine 110 starts up, it generates a tridbit to represent itself. This self tridbit becomes the originating referent for second person pronouns.

Resolving third person pronouns is more complex. To determine the originating referent for a third person pronoun, a qualification list is made from all the assertions that were generated about the pronoun referent. So in the sentence "He wears leather shoes," there would be one qualification on the list. The originating referent of "he" needs to be the subject of a wear event for which leather shoes is the object. The referents in the processing stack are examined, starting from the most recent and searching backwards until a referent that could fulfill the qualifications is found. If we expand the sentence to "He wears leather shoes even though he is a vegetarian," we would add the additional qualification that the originating referent of "he" belongs to the category of vegetarians. If the pronoun is the target or value of an equivalence assertion, an example of which is generated by "He is John Doe," the equivalence supplies the identity of the originating referent.

If a satisfactory originating referent is not found for the pronoun, the rule generating the pronoun is undone and the sentence is reprocessed to see if a different interpretation might be better. For most pronouns other than "it", unresolved pronouns are a common ambiguity of conversation, probably best cleared up by asking, "Whom do you mean by he?"

However, with the word "it" there is an alternative interpretation. It can refer to an intrinsic tridbit similar to the first and second person pronouns that refers to the speaker's immediate environment—the here and now. This is the interpretation that is generated by sentences such as:

"It rained."

"It is dark."

"It is 6:00."

Once a satisfactory originating referent is found, the value of the pronoun referent is filled in with the originating referent's ID. In addition the pronoun is reduced, a process that is done when two referent tridbits are determined to have the same referent. A single referent should not be represented by multiple tridbits. To reduce the pronoun, its referent tridbit is marked as deleted and any references to the pronoun's referent tridbit are replaced by the tridbit ID of the originating referent.

The third post processing function, depicted in block 1480 of FIG. 14, reduces other referents. Referent reduction was explained above in the context of reducing pronouns. In fact, all referents must be examined to see if they might be referring to a referent for which a referent tridbit has already been generated. This is a similar process to reducing pronouns, but entails significantly more judgment and subtlety. Consider the first sentence in the original example and the question that refers back to it:

"June likes computers."

"Who likes computers?"

The verb "like" in each sentence will generate a referent tridbit, so the processing stack will contain two different like event referents. The like event must be examined after the question is processed to determine that it actually refers to the same like event as the first sentence and be reduced. Without doing this, the question can not be answered because the meaning engine 110 will think the question is asking about a different like event than the sentence.

One of the things that makes pronouns easier to reduce than other referents is the fact that you know they need to be reduced. A non-pronoun referent might be the originating referent or it may be a repeat. To make the determination, the qualifications of the referent being evaluated must be compared to its potential originator to judge the feasibility that they have the same referent.

In the example above, the "like" referent tridbit being evaluated has an unknown subject and an object of computers, while its potential originator has a subject of June and an object of computers. The objects match (although they may themselves need to be reduced first to determine this) and the subjects do not, but are compatible, so the judgment is that both referent tridbits refer to the same like event.

But the judgment gets quite subtle as we add additional attributes to referents. Consider the third sentence in the example, followed by a new sentence:

"She drove the sporty gold car to the store that sells computers."

"The persnickety car crashed."

Asserting the car in the second sentence is persnickety does not seem to prevent the judgment that the two cars are the same. However if the second sentence was:

"The green car crashed."

The cars would be assumed to be different, because being green is incompatible with being gold.

It is not uncommon for an entirely different word to refer back to the originating referent, as would be the case in:

"The vehicle crashed."

Another thing that makes pronouns easier to reduce is that their originating referent is expected to exist in the processing stack. Non-pronoun referent tridbits need to check whether an originating tridbit exists in the knowledgebase as well as the processing stack. For example, in order to answer:

"What is the capital of Wisconsin?"

The tridbit that represents Wisconsin needs to identify itself with the tridbit in the knowledgebase that represents Wisconsin, because only the tridbit in the knowledgebase has a capital attribute of Madison.

After the first three post-processing blocks 1460, 1470, 1480, the referents have been accounted for (other than inquiries) and reduced if possible. The remainder of the processing performs any functions implied by sentence. If the sentence is a statement, nothing more needs to be done. If the sentence is a question or a command however, it needs to be answered or the requested action performed.

The fourth post processing function, depicted in block 1490 of FIG. 14, processes questions. Questions are processed the same as any other sentence, resulting in a tridbit representation. Detecting the question mark at the end of a sentence can be a helpful clue that the sentence is a question. However, the main way that the meaning engine 110 determines the sentence is a question, is to detect a tridbit that has an inquiry attribute or truth value.

When an inquiry attribute is detected, the sentence is processed as an information inquiry. A referent tridbit with an inquiry attribute is typically generated by a pronoun such as who or what. The resolution of an inquiry referent proceeds much like the resolution of a third person pronoun. Consider the first question in the example:

"Who likes computers?"

If this were a statement with a third person pronoun it would be:

"She likes computers."

The meaning engine 110 resolves the pronouns Who and She in exactly the same way to determine the originating referent. A qualification list is made from all the assertions that were generated about the pronoun referent. The qualification list is the same for both sentences. It contains one qualification—the originating referent needs to be the subject of a like event for which computer is the object. The originating referent is the same in both cases: June. The difference is that the question needs to be answered, so the meaning engine 110 formulates an answer by coming up with a word or phrase for the originating referent.

The second question in the example is a little more complex:

"What color was the car?"

"What color" is processed by rule 40, which generates an inquiry referent tridbit, as well as a tridbit that asserts that the category of the inquiry referent is color. Thus the inquiry referent will end up with two qualifications to fulfill. The one generated by rule 40, that it be a member of the category color, and that it be a property of the car.

Unlike resolving non-inquiry pronouns, some information inquiries require the meaning engine 110 to search the global knowledgebase 120 for the answer, for example:

"What is the capital of Wisconsin?"

Since the structure of tridbits is the same whether stored in the global knowledgebase 120 or in the local knowledgebase 130, the logic is qualitatively the same. But since the global knowledgebase 120 is stored in a conventional relational database, the queries are expressed in SQL.

Yes-no type questions ask for confirmation of an assertion rather than supplying information, for example:

"Is five more than three?"

"Is five more" is processed by rule 78, which generates an assert compare tridbit whose truth value indicates an inquiry. When the meaning engine 110 detects an inquiry truth value, rather than look for a missing referent given a list of qualifications, it sets out to confirm or refute the given assertion.

If the meaning engine 110 does not come up with the information it needs to answer either type of question, it has two additional methods it can invoke to generate new knowledge: reasoning and observation. Consider the example:

"Jumbo is an elephant."

"What size is Jumbo?"

The meaning engine 110 has not been told directly the size of Jumbo, but it does know that elephants are big. It also has an if-then rule that says if the category of X is C and if C has property P then X has property P. Once the meaning engine 110 realizes it does not have any specific information about the size property of Jumbo, it will check for if-then rules that will result in the type of information it is looking for. It will find the if-then rule that transfers the properties of a category to its members. By applying the rule to Jumbo being an elephant, the meaning engine 110 generates a new assertion that Jumbo has the property of big, and is thereby able to answer the question. If-then rules are also represented by tridbits stored in the knowledgebase.

The meaning engine 110 can also observe information in order to answer a question. Consider:

"What time is it?"

This generates a tridbit asserting that the time attribute of here-now is an inquiry referent. The meaning engine 110 finds no current tridbits that provide the answer, so it checks to see if it can generate useful information through observation. An observation is a sort of black box that the meaning engine 110 can invoke to attempt to fill in the value element of a specific attribute-target pair. It is the equivalent to a human attending to a specific attribute of a sensory experience and coming up a value. If you are asked the color of your shoes and you've forgotten, you look down to retrieve the color attribute of your shoes. In the time example, the meaning engine 110 observes the time attribute of here-now by invoking the appropriate observation function, which reads the computers internal clock. The information is placed in the meaning engine's 110 steam of consciousness, the processing stack, allowing it to answer the question.

The fifth post-processing function, depicted in block 1495 of FIG. 14, processes commands. The meaning engine 110 can be given a command such as:

"Drive the red car to the store."

The tridbit representation of this command has three assert attribute tridbits. The first asserts the object of the drive event is the car. The second asserts the property of the car is red. The third asserts the destination of the drive event is the store. The first assert tridbit was generated by rule 53, whose pattern indicates it is used to convey the main theme of a command. The event within the pattern, in this case the drive event, is what the command is requesting to have done. For things the meaning engine 110 cannot do, such as "Drive the red car to the store," the meaning engine 110 will reply "I can not drive."

The actual commands the meaning engine 110 responds to are limited to those specifically defined, however, the methodology for invoking an action from a natural language request allows new abilities to be easily added. The ability to control household appliances and similar devices will fit naturally within this framework, as well as most any action one could conceive of asking a computer to do.

All of the processing steps the meaning engine 110 goes through to process the words of a sentence into meaning have now been described. This basic framework is useful for processing any English sentence, and any natural language sentence into its underlying meaning represented by tridbits.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A computer-implemented method for processing natural language, comprising:

receiving an information input string comprising at least one stimulus;

for each stimulus, generating a referent tridbit comprising (R1) a referent type element defining a stimulus type selected from the group consisting of a property, a thing, and an event, (R2) a referent value element, (R3) a referent scope:count element, and (R4) a referent attribute element identifying a connection between the referent tridbit and the stimulus;

storing each referent tridbit in computer memory;

generating at least one assert tridbit comprising (A1) a target element that identifies one of the referent tridbits as a target tridbit; (A2) an assert attribute element; and (A3) an assert value element, wherein each assert tridbit defines a relationship among the target tridbit, the assert attribute element and the assert value element;

storing the assert tridbits in computer memory; and validating each assert tridbit by determining that its assert value element is a member of a category defined by its assert attribute element, and that its assert attribute element corresponds to an attribute of the target tridbit.

2. The method of claim 1, further comprising identifying at least two referent tridbits corresponding to the same stimulus and reducing at least one of the referent tridbits.

3. The method of claim 1, wherein each referent tridbit further comprises a label element identifying the referent tridbit.

4. The method of claim 3, wherein the attribute element comprises at least one of a name, a category, and an inference.

5. The method of claim 1, wherein the scope:count element is characterized as at least one of general, specific, or qualified.

6. The method of claim 1, wherein each assert tridbit comprises at least one of an assert attribute tridbit and an assert comparison tridbit.

7. The method of claim 6, wherein each assert attribute tridbit further comprises a truth:certainty element.

8. The method of claim 1, wherein the assert tridbit comprises an assert comparison tridbit defining a comparative relationship between at least two of the referent tridbits.

9. The method of claim 1, wherein the information input string includes a question, and the method further comprises generating at least one assert tridbit representing the question, the assert tridbit having an element with an unknown value representing an answer to the question.

10. The method of claim 1, further comprising applying syntax rules to the information input string to generate the referent tridbits and assert tridbits.

11. A language processing system, comprising:
a rules database operable to store a plurality of syntax rules; and
a meaning engine operable to receive an information input string, to generate a referent tridbit comprising (R1) a referent type element defining a stimulus type selected from the group consisting of a property, a thing, and an event, (R2) a referent value element, (R3) a referent scope:count element, and (R4) a referent attribute element identifying a connection between the referent tridbit and the stimulus based on the syntax rules and to generate at least one assert tridbit comprising (A1) a target element that identifies the referent tridbit as a target tridbit; (A2) an attribute element defining a referent of general scope; and (A3) an assert value element defining a category represented by the referent of the attribute element, each assert tridbit defines a relationship among the target tridbit, the assert attribute element and the assert value based on the syntax rules.

12. A knowledge processing system, comprising:
a knowledgebase operable to store referent tridbits corresponding to stimuli and assert tridbits defining relationships between the referent tridbits; and
a meaning engine operable to access the knowledgebase and perform a reasoning process using at least one referent tridbit comprising (R1) a referent type element defining a stimulus type selected from the group consisting of a property, a thing, and an event, (R2) a referent value element, (R3) a referent scope:count element, and (R4) a referent attribute element identifying a connection between the referent tridbit and the stimulus based on the syntax rules, and to generate at least one assert tridbit comprising (A1) a target element that identifies the referent tridbit as a target tridbit; (A2) an attribute element defining a referent of general scope; and (A3) an assert value element defining a category represented by the referent of the attribute element, each assert tridbit defines a relationship among the target tridbit, the assert attribute element and the assert value.

13. A system for processing natural language, comprising:
means for receiving an information input string;
means for generating a referent tridbit comprising (R1) a referent type element defining a stimulus type selected from the group consisting of a property, a thing, and an event, (R2) a referent value element, (R3) a referent scope:count element, and (R4) a referent attribute element identifying a connection between the referent tridbit and the stimulus;
means for generating assert tridbits comprising (A1) a target element that identifies the referent tridbits as a target tridbit; (A2) an assert attribute element; and (A3) an assert value element, wherein each assert tridbit defines a relationship among the target tridbit, the assert attribute element and a the assert value element;
and means for validating each assert tridbit by determining that its assert value element is a member of a category defined by its assert attribute element, and that its assert attribute element corresponds to an attribute of the target tridbit.

14. A program storage device encoded with instructions that, when executed by a processing device, perform a method for processing natural language, the method comprising:
receiving an information input string comprising at least one stimulus;
for each stimulus, generating a referent tridbit comprising (R1) a referent type element defining a stimulus type selected from the group consisting of a property, a thing, and an event, (R2) a referent value element, (R3) a referent scope:count element, and (R4) a referent attribute element identifying a connection between the referent tridbit and the stimulus;
generating at least one assert tridbit comprising (A1) a target element that identifies one of the referent tridbits as a target tridbit; (A2) an assert attribute element; and (A3) an assert value element, wherein each assert tridbit defines a relationship among the target tridbit, the assert attribute element and the assert value element; and
validating each assert tridbit by determining that its assert value element is a member of a category defined by its assert attribute element, and that its assert attribute element corresponds to an attribute of the target tridbit.

* * * * *